US006625895B2

(12) United States Patent
Tacklind et al.

(10) Patent No.: US 6,625,895 B2
(45) Date of Patent: Sep. 30, 2003

(54) SERVO-CONTROLLED AUTOMATIC LEVEL AND PLUMB TOOL

(75) Inventors: Christopher A. Tacklind, Palo Alto, CA (US); Zinovy Dolgonosov, San Francisco, CA (US)

(73) Assignee: Toolz, Ltd., Mountain View, CA (US)

( * ) Notice: Subject to any disclaimer, the term of this patent is extended or adjusted under 35 U.S.C. 154(b) by 0 days.

(21) Appl. No.: 10/004,694

(22) Filed: Dec. 4, 2001

(65) Prior Publication Data

US 2003/0101605 A1 Jun. 5, 2003

(51) Int. Cl.[7] ............................................. G01C 15/00
(52) U.S. Cl. ........................... 33/286; 33/290; 33/291; 33/DIG. 21; 33/282; 33/275 R; 33/283; 33/285; 33/292; 33/381; 33/382; 33/391; 33/397; 356/148; 356/249
(58) Field of Search .......................... 33/286, 290, 291, 33/DIG. 21, 282, 275 R, 283, 285, 292, 381, 382, 391, 397; 356/148, 249

(56) References Cited

U.S. PATENT DOCUMENTS

| | | | |
|---|---|---|---|
| 3,279,070 A | | 10/1966 | Blount et al. |
| 3,684,381 A | | 8/1972 | Zoot |
| 3,771,876 A | | 11/1973 | Ljungdahl et al. |
| 3,897,637 A | | 8/1975 | Genho |
| 4,031,629 A | * | 6/1977 | Paluck ........................ 33/290 |
| 4,082,466 A | * | 4/1978 | Underberg ................. 356/249 |
| 4,221,483 A | | 9/1980 | Rando |
| 4,751,782 A | * | 6/1988 | Ammann ..................... 33/291 |
| 4,852,265 A | | 8/1989 | Rando et al. |
| 4,912,851 A | | 4/1990 | Rando et al. |
| 5,101,570 A | * | 4/1992 | Shimura ................. 33/366.16 |
| 5,144,487 A | | 9/1992 | Hersey |
| 5,184,406 A | | 2/1993 | Swierski |
| 5,212,889 A | * | 5/1993 | Lysen .......................... 33/286 |
| 5,272,814 A | * | 12/1993 | Key ............................. 33/290 |
| 5,421,094 A | * | 6/1995 | McCord et al. ............... 33/390 |
| 5,461,425 A | | 10/1995 | Fowler et al. |
| 5,485,266 A | * | 1/1996 | Hirano et al. .................. 33/291 |
| 5,552,886 A | * | 9/1996 | Kitajima et al. ............ 356/250 |
| 5,606,802 A | * | 3/1997 | Ogawa ......................... 33/283 |
| 5,610,711 A | * | 3/1997 | Rando ........................ 356/247 |
| 5,619,802 A | * | 4/1997 | Rando et al. ................. 33/291 |
| 5,718,054 A | * | 2/1998 | Kitajima ....................... 33/286 |
| 5,742,387 A | * | 4/1998 | Ammann ...................... 33/291 |
| 5,819,424 A | * | 10/1998 | Ohtomo et al. ............... 33/290 |
| 5,847,820 A | * | 12/1998 | Hamar ........................ 356/148 |
| 5,960,551 A | * | 10/1999 | Nishi et al. ................... 33/292 |
| 6,314,650 B1 | * | 11/2001 | Falb ............................ 33/286 |

OTHER PUBLICATIONS

U.S. patent application No. 09/571,482, entitled "Self–Leveling Penta Laser Beam Device", filed May 16, 2000.
International Search Report, dated Apr. 14, 2003.

* cited by examiner

*Primary Examiner*—Diego Gutierrez
*Assistant Examiner*—Amanda J Hoolahan
(74) *Attorney, Agent, or Firm*—Beyer Weaver & Thomas, LLP

(57) ABSTRACT

A method and apparatus for leveling at least one output light beam in a construction tool. One embodiment of the apparatus includes a laser optical assembly for producing output light beams that define plumb, level, and right angle beams for use in construction applications. The optical assembly is mounted on an optical platform which permits tilting about "slip-stick" joints that define two perpendicular axes of rotation. Such joints allow the optical platform to change its angle of tilt in response to an applied torque and to maintain the changed angle of tilt until further torque is applied. Also, the "slip-stick" mechanism prevents substantial movement or oscillation of the optical platform in the absence of the applied torque. The embodiment further includes a sensor element for determining whether the output beams are level. In the event the output beams are not level, control circuitry of the embodiment activates a driving element to controllably apply torque to the optical platform thereby tilting the optical platform until the output beams are leveled.

50 Claims, 14 Drawing Sheets

SERVO-CONTROLLED AUTOMATIC LEVEL AND PLUMB TOOL

TECHNICAL FIELD

The invention described herein relates generally to alignment tools that generate optical alignment beams. More particularly, improved leveling mechanisms for automatically leveling the outputted beam(s) are described.

BACKGROUND

A variety of survey and carpentry tools have previously employed lasers. The first laser alignment tools were manually leveled as in U.S. Pat. No. 3,897,637 and U.S. Pat. No. 3,279,070. Subsequently, self-leveling instruments were employed to improve accuracy and reliability.

In one type of leveling instrument, an entire laser is suspended by a pendulum and leveled by gravity. For example, in U.S. Pat. No. 3,771,876 a He—Ne laser and chassis are hung by a flexible support to create a plumb beam which is subsequently directed in the horizontal plane using a pentaprism. FIG. 1 herein shows that system, with the laser 4 hung by a wire 2 over a pentaprism 10. The beam exits by a window 14, while the pentaprism 10 is rotated by a motor 16. The pendulous oscillation of the laser 4 is damped out by a magnet 12. Alternative approaches have used viscous fluids to damp the oscillations.

Another laser leveling system is described in U.S. Pat. No. 5,184,406 and is shown in FIG. 2. A laser diode assembly 22 is mounted on a float 26, which is supported by a liquid 28 in a vessel 24. The laser beam remains plumb in spite of the tilt of the vessel. In another approach shown in FIG. 3, U.S. Pat. No. 5,144,487 uses a ball bearing pendulum. Platform 23 is suspended by a ball bearing pivot 25 within a housing 29. An optical assembly within the platform 23 generates multiple collimated laser beams 21 for alignment purposes. The platform motion is damped by eddy currents induced by a magnet 27. The use of several ball bearings makes the instrument expensive, large, and of limited accuracy and ruggedness.

In another distinct approach, a laser is rigidly mounted to a housing of the unit and a compensation means (typically, lensing devices) is used to correct for the tilt of the housing. For example, in U.S. Pat. No. 3,684,381, a thin film of oil 36 is contained by an upper window 34 and a housing 35 (shown in FIG. 4). This thin film of oil 36 is used to create a correcting prism which directs the downwardly directed laser beam 32 toward the plumb direction. The oil prism is formed by the upper level of the oil 36 which is level and a lower window 38 which is tilted. A laser source is mounted in a laser housing 30. This system is accurate only when two cells with oil of index of refraction 1.5000 are used. This system has proven inadequate due to the absence of a fluid having the desired properties over the normal temperature range. In addition, the meniscus of the oil film 36 at the edges of the chamber contributes to wave front errors. In the system of FIG. 4, a pentaprism 40 (which is typically spinning) directs the plumb beam into a horizontal plane.

Several methods have been developed to tilt compensate a laser beam using wires. For example, in U.S. Pat. No. 4,221,483 a pendulous lens hangs below a laser diode. As the housing is tilted, the lens motion under gravity is proportional to the tilt angle, which steers the laser beam to the plumb position. A pentaprism again converts the plumb beam to the horizontal plane. In a system described in U.S. Pat. Nos. 4,852,265 and 4,912,851 and shown in FIG. 5, a laser beam 41 is reflected from a mirror 43 on a platform 46 which is suspended from a single wire 44. The reflected laser beam 42 is compensated by the tilt of the platform under the force of gravity. The length and diameter of the wire are chosen so that when the housing of the unit is tilted exactly one degree, the platform tilts exactly one half of one degree. Because of the two-to-one relationship between mirror tilt and beam correction, the laser beam is restored to its plumb direction after being tilted. These patents also show laser diodes mounted on cantilevers which respond to housing tilt to correct the output beam.

Each of the foregoing laser leveling techniques and apparatuses suffers from accuracy limitations, ruggedness concerns, and/or the expense of the components. In particular, devices requiring pendulums require expensive low-friction joints to allow free motion of the laser. These low friction pendulums are subject to oscillations (at the slightest touch) that require a long time to settle. As a result, such pendulum devices require expensive, difficult to perfect damping mechanisms to overcome the oscillation problems. What is needed is a method and apparatus for overcoming these and other difficulties in a relatively low-cost laser level device.

SUMMARY OF THE INVENTION

In accordance with the principles of the present invention, an apparatus and method for achieving automatic beam leveling are disclosed.

In one embodiment, an optical level comprises an optical assembly for generating a light beam and a platform that supports the optical assembly. The embodiment includes a slip-stick mechanism that pivotably supports the platform for rotation in at least one degree of freedom. The slip-stick mechanism provides sufficient stiction to hold the platform in place even when the platform is tilted somewhat relative to level. The slip-stick mechanism also permits the platform to pivot with relatively lower friction when the stiction is overcome. The embodiment includes an actuator arranged to cause motion of the platform by supplying sufficient force to the platform to overcome stiction from the slip-stick mechanism.

Yet another optical level embodiment comprises an optical assembly for generating an output light beam and a platform that supports the optical assembly. As with the foregoing embodiment, a slip-stick mechanism and an actuator are included. The embodiment includes a sensor for providing signals that may be used to determine whether the platform is level. The sensor includes a detector light source, a position sensitive light detector, and a two-axis bubble level. The two-axis bubble level is positioned with respect to the detector light source and the position sensitive light detector, such that detector light produced by the detector light source is projected through the two-axis bubble level onto the position sensitive light detector. Because the two-axis bubble level is aligned with the output beam, the detector can determine whether the two-axis bubble level is leveled and thereby whether the output beam is leveled.

Yet another embodiment comprises a leveling assembly that includes a pivotably mounted platform capable of rotation in at least one degree of freedom. The platform also including an actuator arranged to cause motion of the platform by supplying sufficient force to tilt the platform. The platform also includes a sensor for providing signals that may be used to determine whether the platform is level.

In a related embodiment, the sensor comprises a detector light source for producing detector light and a position sensitive light detector that is sensitive to the detector light. A two-axis bubble level is aligned with the platform, such that when the two-axis bubble level is leveled, the platform is also level. The light source is positioned so that it projects the detector light through the two-axis bubble level onto the position sensitive light detector so that the detector can determine whether the platform is leveled.

In yet another related embodiment, the leveling assembly further comprises a slip-stick mechanism providing sufficient stiction to hold the platform in place even when the platform is tilted somewhat relative to level, while permitting the platform to pivot with relatively lower friction when the stiction is overcome; and, wherein, the actuator can cause motion of the platform by supplying sufficient force to the platform to overcome stiction from the slip-stick mechanism.

In another embodiment, the apparatus comprises a beam projecting element tiltably mounted such that the optical assembly can tilt about two axes and hold its position. The optical assembly is capable of generating at least one visible light beam. The apparatus also includes a driving element, which when appropriately activated can tilt the optical assembly about either of the two axes and a sensor element for determining if the light beams generated by the optical assembly are level. The apparatus also includes control circuitry for controllably activating the driving element to tilt the optical assembly in a manner so that the light beams are substantially level.

In a further embodiment, the apparatus includes a slip-stick mechanism that enables an optical assembly to move in response to torque applied by the driving element and prevents substantial movement or oscillation of the optical assembly in the absence of actuator induced torque.

In yet another embodiment, the principles of the present invention teach an apparatus for projecting a visible light beam in level or plumb direction, in spite of a tilted condition of the apparatus, the apparatus comprising a housing; an optical platform tiltably mounted in the housing such that it can tilt in two axes about slip-stick joints; an optical assembly mounted on the optical platform, the optical assembly capable of generating at least three orthogonal output light beams; an actuator element which, when appropriately activated, tilts the optical platform about said two axes; a sensor element for determining if the optical assembly is level; and, a control circuitry for controllably activating the actuator element to tilt the optical platform so that the output beams are level.

Another embodiment comprises a method for generating output beams in a level or plumb direction, in spite of a tilted condition of an optical assembly. The method comprises mounting an optical assembly such that the optical assembly can tilt about two axes and hold its position after being controllably tilted, the optical assembly capable of generating at least one visible light beam. The method further comprises sensing if the light beams generated by the optical assembly are level. In the event that the light beams generated by the optical assembly are not level, the optical assembly is controllably tilted to a new angle. The method further comprises sensing if the light beams generated by the optical assembly are level when the optical assembly is at the new angle. If the new angle is such that the light beams are not level, the optical assembly is controllably tilted to another angle. The method further comprises continuously sensing and tilting until the light beams are level.

Other aspects and advantages of the invention will become apparent from the following detailed description and accompanying drawings which illustrate, by way of example, the principles of the invention.

BRIEF DESCRIPTION OF THE DRAWINGS

The following detailed description will be more readily understood in conjunction with the accompanying drawings, in which:

FIG. 1 is a partial section view of a pendulous laser projector hanging by a single support above a rotating pentaprism.

FIG. 2 is a partial section view of a laser projector on a floated platform for projecting a self-leveled laser beam.

FIG. 3 is a partial cut-away drawing of a self-leveling platform using a ball bearing pivot.

FIG. 4 is a partial section view of a laser projector and a liquid film compensation means for projecting a level laser beam.

FIG. 5 is a partial section view showing a laser projector with a wire compensation means for producing a plumb beam directly and a level beam with the aid of a pentaprism.

It is to be understood that in the drawings like reference numerals designate like structural elements.

DETAILED DESCRIPTION OF THE DRAWINGS

The present invention has been particularly shown and described with respect to certain preferred embodiments and specific features thereof. The embodiments set forth hereinbelow are to be taken as illustrative rather than limiting. It should be readily apparent to those of ordinary skill in the art that various changes and modifications in form and detail may be made without departing from the spirit and scope of the invention.

Figure 1:
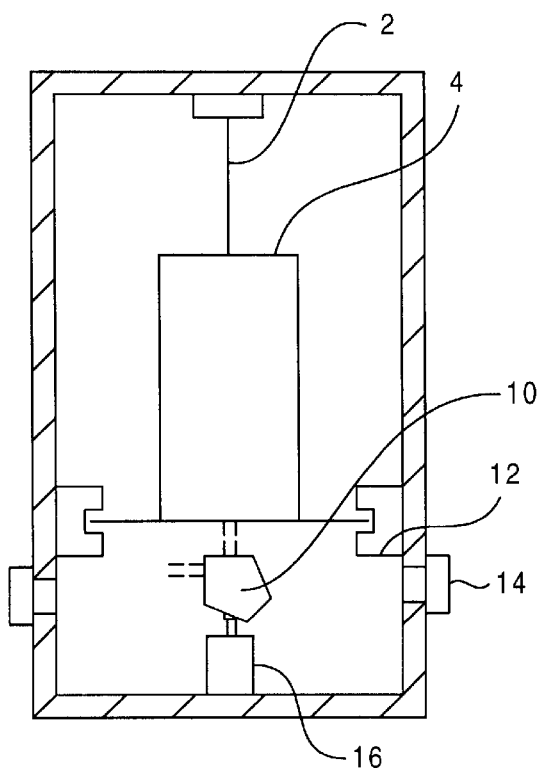
FIGS. 1 through 5 illustrate aspects of prior art beam leveling and plumbing devices.
Figure 4:
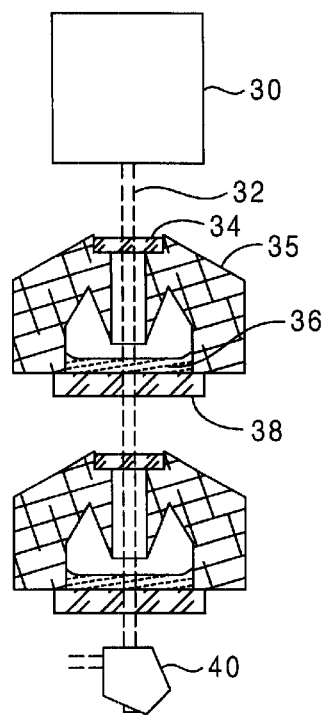
Figure 2:
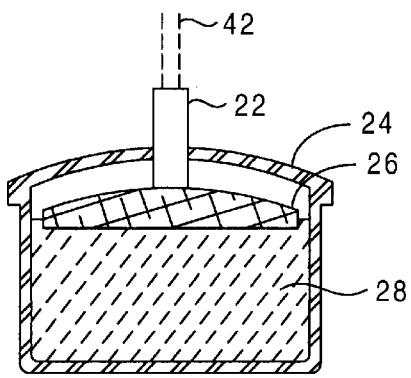
Figure 5:
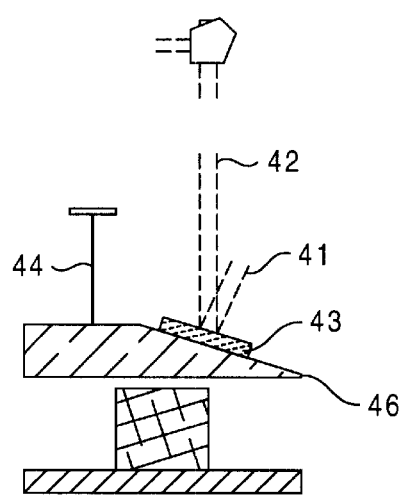
Figure 3:
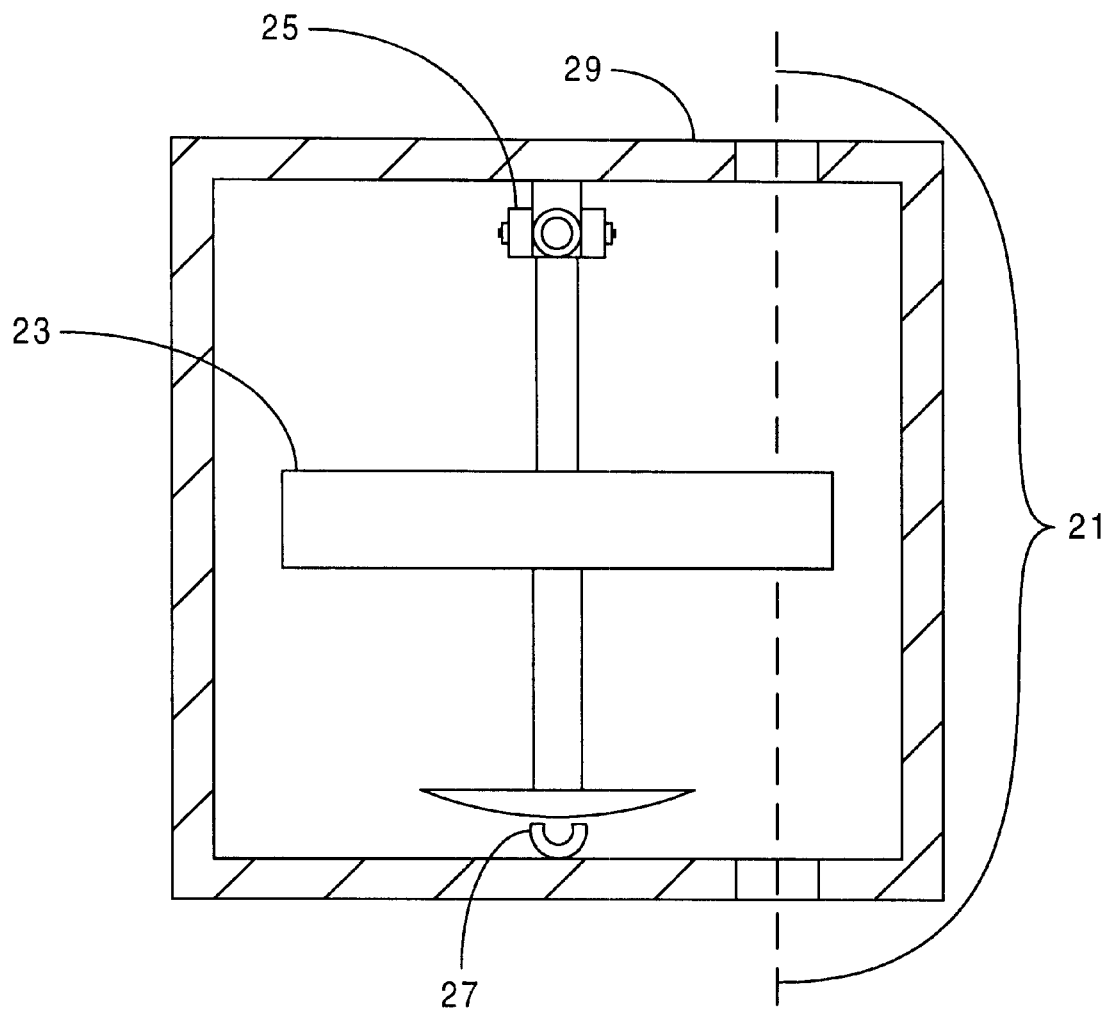
Figure 6:
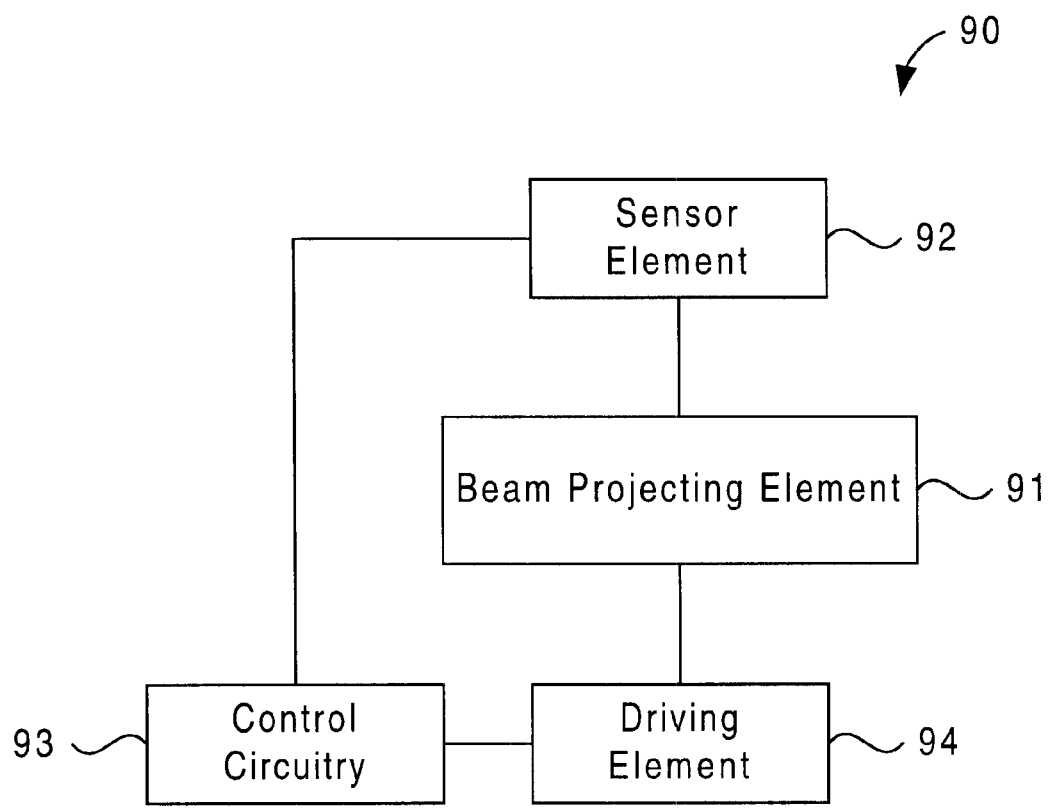
FIG. 6 is a block system diagram of an embodiment of an automatic self-leveling tool capable of practicing the principles of the present invention.

One embodiment of a system in accordance with the principles of the present invention can be simply illustrated with reference to the block system diagram 90 of FIG. 6. The system includes movable beam projecting element (also referred to herein as an optical assembly) 91, sensor element 92, control circuitry 93, and driving element 94. The movable optical assembly 91 produces at least one output light beam. Sensor element 92 detects whether the optical assembly 91 is level (thereby determining whether the output beams are level). Information provided by the sensor element 92 concerning whether the output beams are level is provided to control circuitry 93. The control circuitry 93 uses the sensor information to selectively activate driving element 94 to adjust tilt angles of the optical assembly 91, thereby leveling the output beams.

The principles of the present invention can be illustrated with reference to the simplified schematic illustrations of FIGS. 7A–7D. The embodiment 60 shown in FIGS. 7A–7D is simplified and depicted having only one axis of rotation. Other embodiments having two axes of rotation are described in greater detail hereinbelow. The embodiment 60 includes a housing 61, an optical assembly 62 tiltably mounted in the housing 61, a driving element 63 for tilting the optical assembly 62, and a sensor element 80.

Figure 7A:
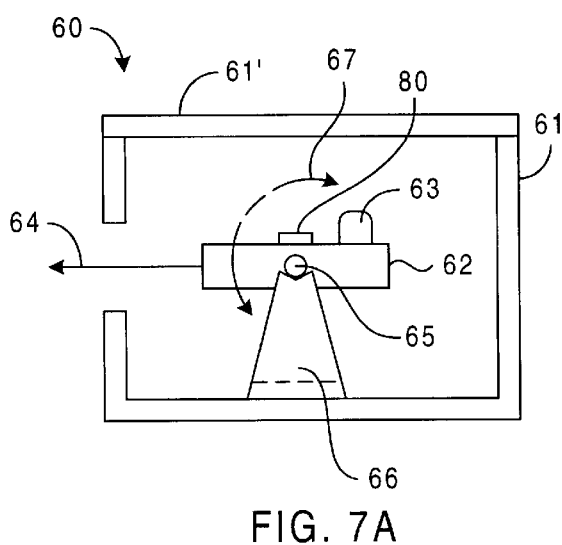
FIGS. 7A–7D depict various views of a single axis leveling device in accordance with the principles of the present invention.
Figure 7B:
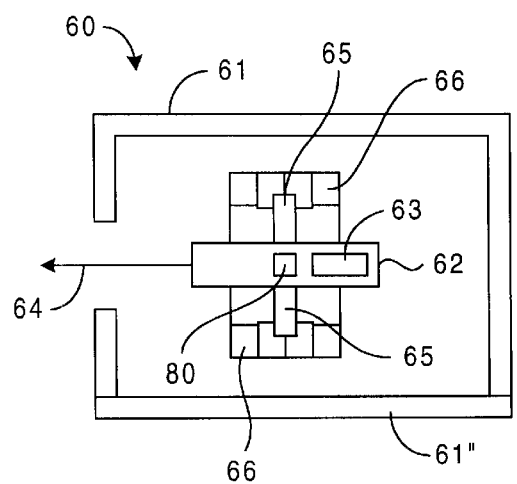

Referring to FIGS. 7A and 7B, FIG. 7A shows a side view of the embodiment 60 with a side wall 61" of the housing 61 removed to permit an interior view. FIG. 7B is a top down view of the embodiment 60 with the roof 61' of the housing 61 removed. The optical assembly 62 is tiltibly positioned inside the housing 61. The optical assembly 62 produces an output beam 64 (e.g., a collimated laser beam) that is projected through an opening in the housing 61. In the depicted embodiment 60, the optical assembly 62 includes pins 65 which support the optical assembly 62 in a cradle 66, forming a joint such that the optical assembly 62 can rotate about an axis 67 (depicted by the dashed arrow) defined by the axis of the pins 65. The joint includes a "slip-stick" mechanism that provides sufficient stiction to hold the optical assembly 62 in place even when the assembly is tilted somewhat relative to level, while permitting the assembly to pivot with relatively lower friction when the stiction is overcome. This enables the optical assembly 62 to move in response to a torque applied to the optical assembly 62 and also prevent substantial movement or oscillation of the optical assembly 62 in the absence of this applied torque. In short, the "slip-stick" mechanism allows the optical assembly 62 to tilt in response to the applied torque and maintain its new angle of tilt until additional applied torque is applied.

In the depicted embodiment, "slip-stick" joint uses a "slip-stick" mechanism comprising the cradle 66 and pins 65. For example, the pins 65 can be inserted into the cradle 66, fitting such that the optical assembly 62 can be rotated in response to a torque of a sufficient magnitude, but that otherwise does not freely rotate. Thus, torques of an appropriate magnitude can be applied to rotate the optical assembly 62 to change its angle of tilt which is maintained by the "slip-stick" mechanism (here, pins 65 and cradle 66). Moreover, the "slip-stick" mechanism also prevents substantial movement or oscillation of the optical assembly in the absence of the applied torque. Other embodiments of "slip-stick" mechanisms are contemplated by the inventors. An example of a suitable "slip-stick" embodiment includes a pin 65 which sets in a cradle 66 such that the friction between the pin 65 and the cradle 66 provides the "slip-stick" mechanism. The applied torque is provided by a driving element 63. It should be noted that the optical assembly 62 is not required to have pins and can instead be mounted on a movable optical platform which is tiltably positioned in the housing using a "slip-stick" joint. Other examples of "slip-stick" embodiments include, but are not limited to, those discussed hereinbelow with respect to FIGS. 15, 16, and 17.

Figure 7C:
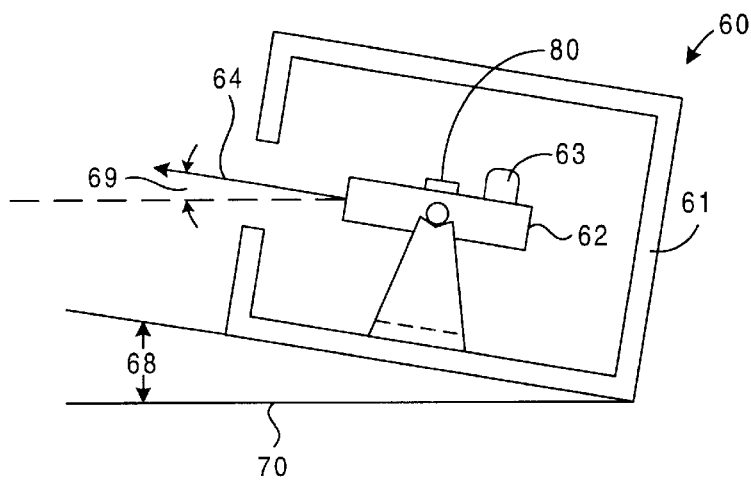
Figure 7D:
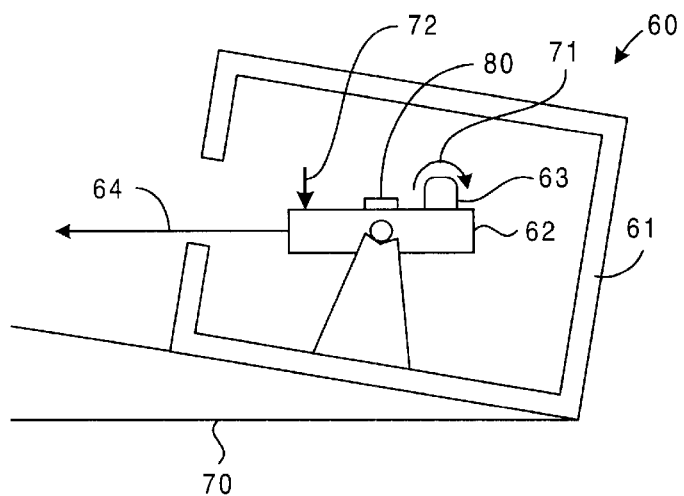

In FIG. 7C, when the housing 61 is tilted from the level (represented here by line 70), the optical assembly 62 and the output beam 64 produced by the beam projecting are also tilted. The angle of tilt 68 between the level 70 and the housing 61 is shown. The angle of tilt 69 between the level and the output beam 64 is also shown. Referring to FIG. 7D, in order to level the output beam 64, the driving element 63 is activated to apply torque to the optical assembly 62, thereby tilting the output beam 64 toward level. One or more actuators can be used in the driving element 63 to apply torque to the optical assembly 62. The inventors contemplate that many different types of actuators known to those having ordinary skill in the art may be used to apply torque to the optical assembly 62. The embodiment 60 of FIG. 7D depicts the use of an electric motor in the driving element 63. By spinning the motor 63 in a first direction 71 (indicated by the arrow), a reactive torque (shown by arrow 72) is applied in an opposite direction, thereby moving the optical assembly 62 so that the output beam 64 becomes level. In the illustrated embodiment, the axis of rotation for the motor 63 is substantially parallel to axis of rotation 67 as shown in FIG. 7A (defined by the axis which the optical assembly 62 rotates about the pins 65). It is to be noted that the actuator may be positioned in any manner, provided that some component of the torque provided by the actuator induces the optical assembly 62 to tilt about the axis defined by the pins 65. Repeated activation of the actuator 63 may be required to level the beam 64.

In other embodiments, a wide variety of alternative actuators can be used to apply the required torque to the optical assembly 62. By way of example, voice coils, motors with gear drives, solenoids, and a variety of other actuators may readily be used.

FIGS. 7A–7D, 8, and 9 address another aspect of the invention. The depicted embodiments include a sensor element 80 that is used to detect whether the output beam 64 is level. By attaching sensor element 80 to an optical assembly 62 and calibrating the sensor element 80 such that it reads as level when the output beam 64 is level, the sensor element 80 can be used to level the beam 64. In an additional embodiment, the sensor element 80 can be calibrated so that when the sensor is leveled the output beam 64 is projected at some predetermined angle other than level. Also, in a related embodiment, the system can be set up so that when the sensor element 80 is oriented at some predetermined non-level position, the output beam 64 is level. This sort of embodiment can use the electronics of control circuitry to accommodate the difference between output beam 64 angle and sensor 80 orientation. Techniques for using control circuitry electronics to accomplish this are known in the art.

Figure 8A:
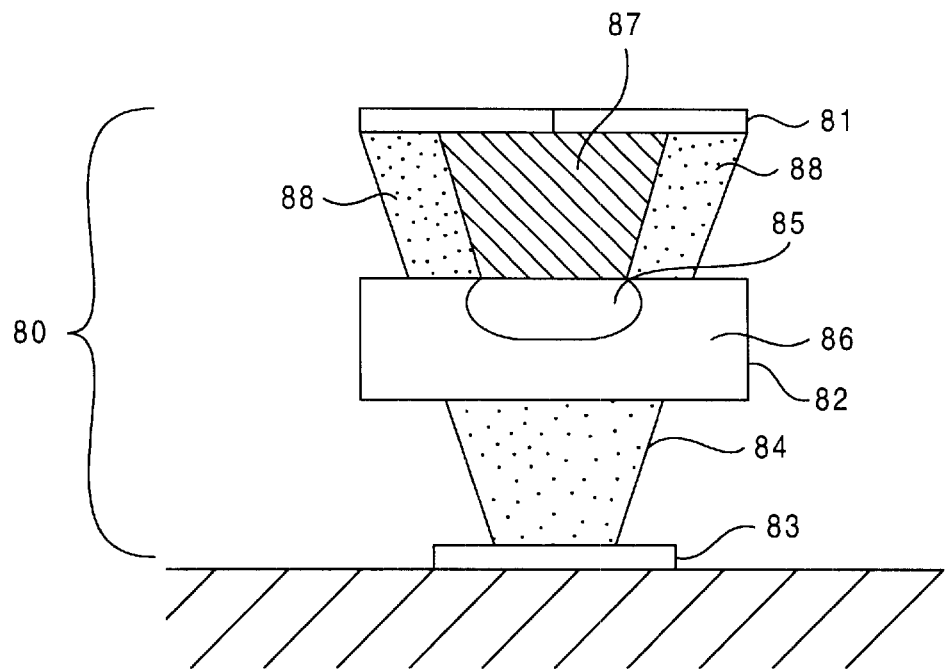
FIGS. 8A and 8B are side views of sensor element upward and downward pointing sensor embodiments in accordance with the principles of the present invention.
Figure 8B:
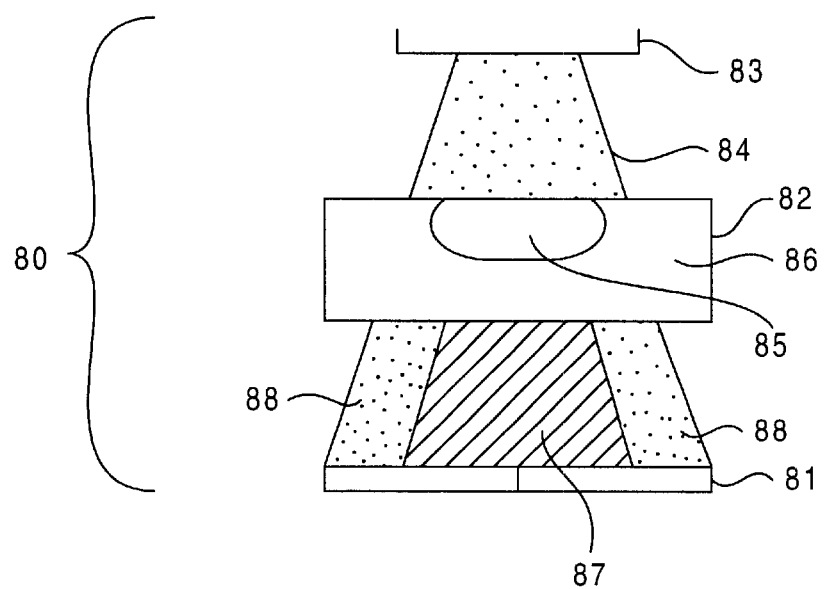

FIG. 8A is a cross-section view of a sensor embodiment. The sensor element 80 includes a position sensitive photo sensor 81, a bubble level device 82, and a detector light source 83 for generating a detector light beam 84 (also referred to as detector light). Many different types of detector light sources including, but not limited to, incandescent bulbs, laser diodes, and light emitting diodes (LED's) can be used, LED's being preferred. The detector light 84 is passed through the bubble level device 82 onto a position sensitive photo sensor 81, which detects whether the bubble level 82 is leveled (as is the case in FIG. 8). In the depicted embodiment 80, the beam 84 passes readily through the fluid 86 of the bubble level 82 but is refracted by the bubble 85. As a result, a "doughnut" shaped light beam 88 exits the bubble level 82. This is characterized by a dark or shadow region 87 (also referred to herein as a dark spot) defined by the bubble 85. Surrounding the shadow region 87 is an annular shaped light ring 88. Although the sensor 80 is depicted with the detector beam 84 pointing upward, the sensor 80 can be oriented so that the beam 84 points downward passing through a bubble level device 82 onto a position sensitive photo sensor 81 positioned under the bubble level device 82. Such a downward pointing sensor is depicted in FIG. 8B.

FIG. 8A depicts a simplified example wherein the bubble level device 82 is depicting bubble leveling in one axis. In this example, as the one axis bubble level is tilted to the left or right, the bubble 85 moves from the center. This alters the position and amount of light being sensed by the position sensitive photo sensor 81.

Figure 9:
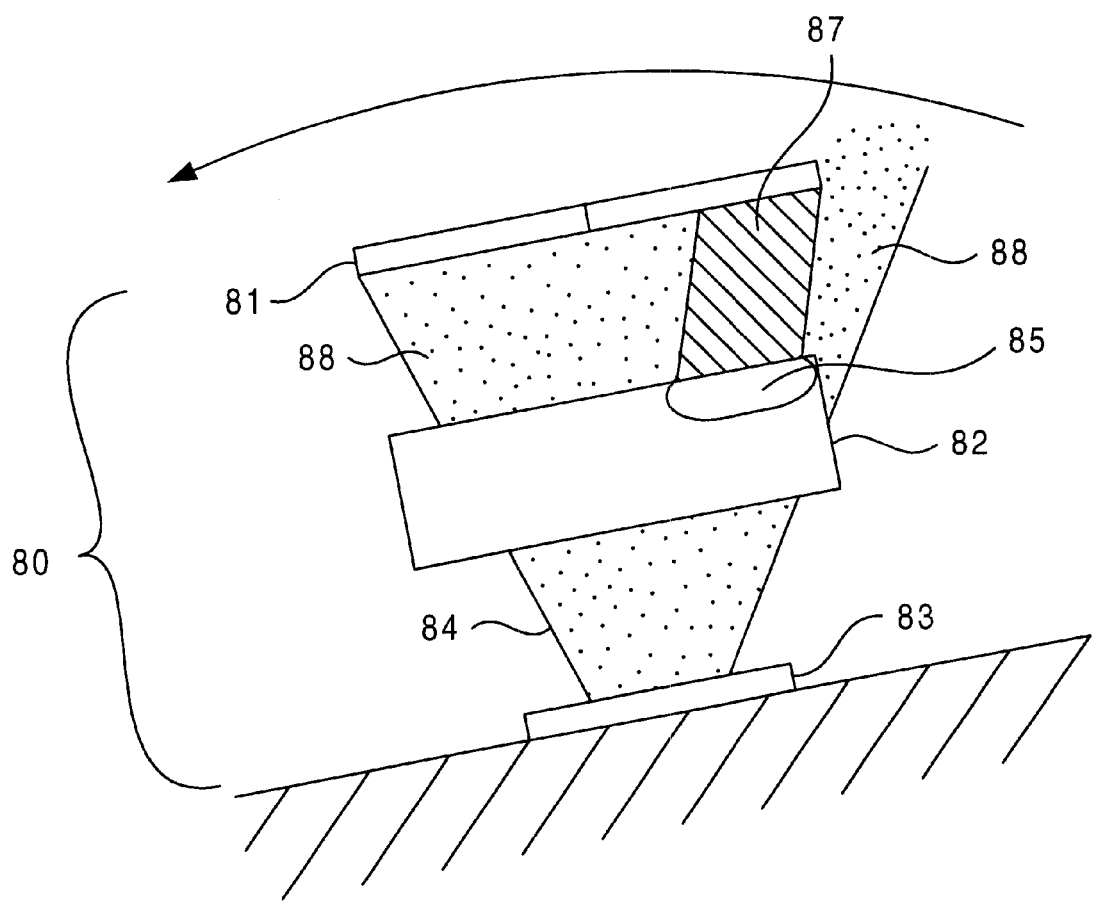
FIG. 9 is a side view of a sensor embodiment tilted in accordance with the principles of the present invention

FIG. 9 shows a detector 80 tilted to the left. Consequently, the bubble 85 moves to the right, altering the amount and position of light 88 sensed by the position sensitive photo sensor 81. In accordance with the principles of the present invention, the position sensitive photo sensor 81 provides information to control circuitry (not shown here), which activates driving element 63 (of FIGS. 7A–7D) to correct the tilt in the output beam 64.

Figure 10:
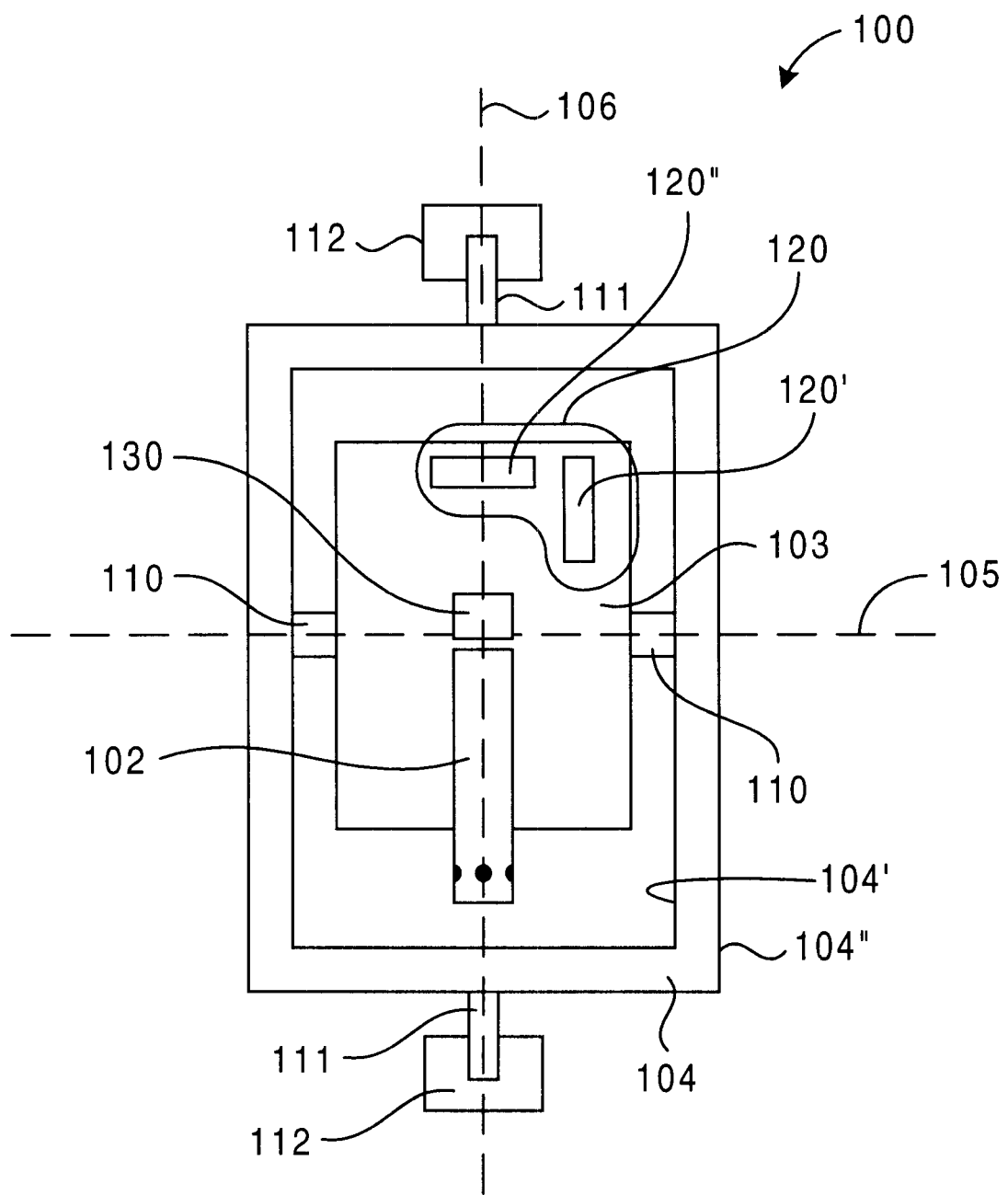
FIG. 10 is a top down view of a portion of a bi-axial laser beam leveling device in accordance with the principles of the present invention.

A preferred embodiment of the present invention mounts an optical assembly so that it can tilt in multiple degrees of freedom. The depicted embodiment is tiltable in two axes. Therefore, a detector element must be able to provide leveling information with respect to these two axes. Such a bi-axial embodiment 100 is depicted in FIG. 10. FIG. 10 is a top down view of a portion of a bi-axial laser beam leveling device in accordance with the principles of the present invention. The depicted embodiment 100 includes an optical assembly 102 mounted on movable optical platform 103. The optical platform 103 is positioned to allow tilting in two axes. Also mounted on the optical platform 103 are driving element 120 and detector element 130. The optical platform 103 include "slip-stick" joints to enable tilting in response to torques applied by the driving element 120 and such that minimal movement or oscillation of the optical assembly 102 occurs in the absence of said applied torques.

The depicted embodiment 100 is typically enclosed in a housing and comprises an optical assembly 102 mounted on a movable optical platform 103. One example of a suitable optical assembly 102 is described in U.S. patent application Ser. No. 09/571,482 entitled "Self-Leveling Penta Laser Beam Device" filed on May 16, 2000, and which is incorporated by reference hereinabove. Such an optical assembly 102 can produce five light beams. The five beams include two pairs of oppositely directed and substantially colinear light beams. These two pairs intersect each other at substantially 90° angles. Another beam is produced that intersects the two pairs of beams and also lies at substantially 90° to the two pairs of beams. These beams can be used to define plumb, level, and right angle directions. Although the above-described optical assembly is preferred, almost any optical assembly that produces at least one laser beam may be used in accordance with the principles of the present invention.

The optical assembly 102 is mounted on an optical platform 103 that can be tilted about two axes of rotation. This can be accomplished by tiltably positioning the optical platform 103 inside a frame 104 such that the movable optical platform 103 can rotate about a first axis 105, and mounting the frame 104 such that it can rotate about a second axis 106. In the preferred embodiment, the first axis 105 is at substantially 90° to the second axis 106. The mounting of the optical platform 103 to the frame 104 is such that it can tilt about said first axis 105 in the "slip-stick" manner. Similarly, the frame 104 is positioned such that it can tilt about said second axis 106 in the "slip-stick" manner. In one embodiment, the optical platform 103 includes a first pair of pins 110 that are engaged with the inner periphery 104' of the frame 104 such that the first pair of pins 110 define the first axis 105. The first pair of pins 110 and the frame 104 form a "slip-stick" joint (i.e., the optical platform 103 moves in response to torque applied by the driving element 120, but does not undergo substantial movement or oscillation in the absence of driving element 120 induced torque). The frame 104 includes a second pair of pins 111 at the outside periphery 104" of the frame. The second pair of pins 111 is engaged to a support 112 such that the second pair of pins 111 defines the second axis 106. Typically, the support 112 is mounted to, or forms part of, a housing (not shown in this view). As with the first pair of pins 110, the engagement between the second pair of pins 111 and the support 112 forms a "slip-stick" joint. Specific embodiments of particular "slip-stick" joints are described in detail hereinbelow.

Again referring to the bi-axial embodiment of FIG. 10, the output beams can be automatically leveled in two-dimensions. As with the one axis embodiments described hereinabove, the optical assembly 102 can be controllably tilted using driving element 120. In the depicted embodiment, the driving element comprises two actuators 120', 120". The actuators are positioned such that torque applied to the embodiment by a first actuator 120' is at substantially 90° to torque applied by a second actuator 120". In the depicted embodiment, the two actuators 120', 120" are electric motors. When activated, the first motor 120' applies a reactive torque that causes the platform 103 to tilt about first axis 105. Similarly, when activated the second motor 120" applies a reactive torque that causes the frame 104 to tilt about second axis 106. These actuators 120', 120" are controlled by the control circuitry of the device (not shown here). Alternatively, the actuators 120', 120" can be mounted so that each actuator causes the platform 103 to tilt about both axes 105, 106 simultaneously.

One example of a suitable driving element 120 comprises a pair of electric motors (corresponding to actuators 120', 120"), such as a Model No. RF-400CA, produced by Mabuchi Motor Co., Ltd. of Matsudo, Japan. In other embodiments, a wide variety of alternative actuators may be utilized to move the optical assembly 102. For example, electromagnetic actuators that use the interaction of electromagnetic coils with permanent magnets to apply torque to the optical platform can be used. The inventors contemplate other driving elements using other types of actuators including, but not limited to, electrostatic actuators, fan arrangements, or small motor driven weights.

Figure 12:
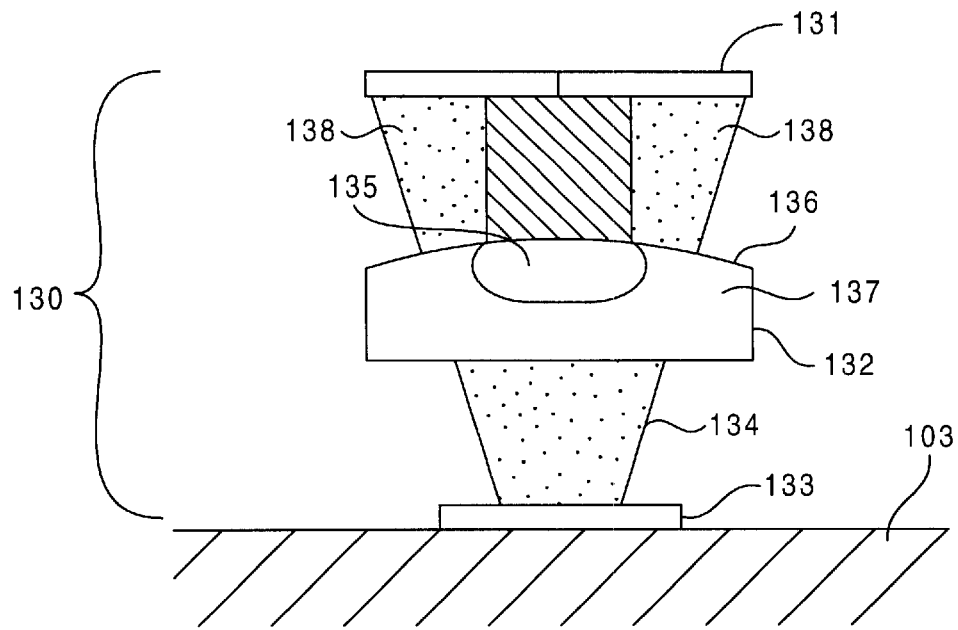
FIG. 12 is a side-section view of a two-axis detector element mounted on an optical platform in accordance with the principles of the present invention.

As explained with respect to the single-axis examples above, the embodiment of FIG. 10 uses a detector element 130 to sense whether the output beams are level. In the depicted embodiment, the detector element 130 is positioned on the optical platform 103 so that when the output beams are level, the detector element 130 reads as level. Referring to FIG. 12, the detector element 130 includes a position sensitive photo sensor 131, a two-axis bubble level 132, and a detector light source 133 for generating a detector light beam 134 (also referred to as detector light). As with the previously described, detector element (80 of FIG. 8), the detector light 134 is passed through the bubble level 132 onto the position sensitive photo sensor 131 which detects whether the bubble level 132 is leveled (and thereby when the output beams are leveled). Since the illustrated embodiment is tiltable in two degrees of freedom, a detector (e.g. bubble level) that is sensitive to tilting in two degrees of freedom is particularly appropriate. In other embodiments, an angled pair of one dimensional tilt detectors may be used. It is to be noted that other embodiments of detector elements can be used in accordance with the principles of the present invention.

Figure 11A:
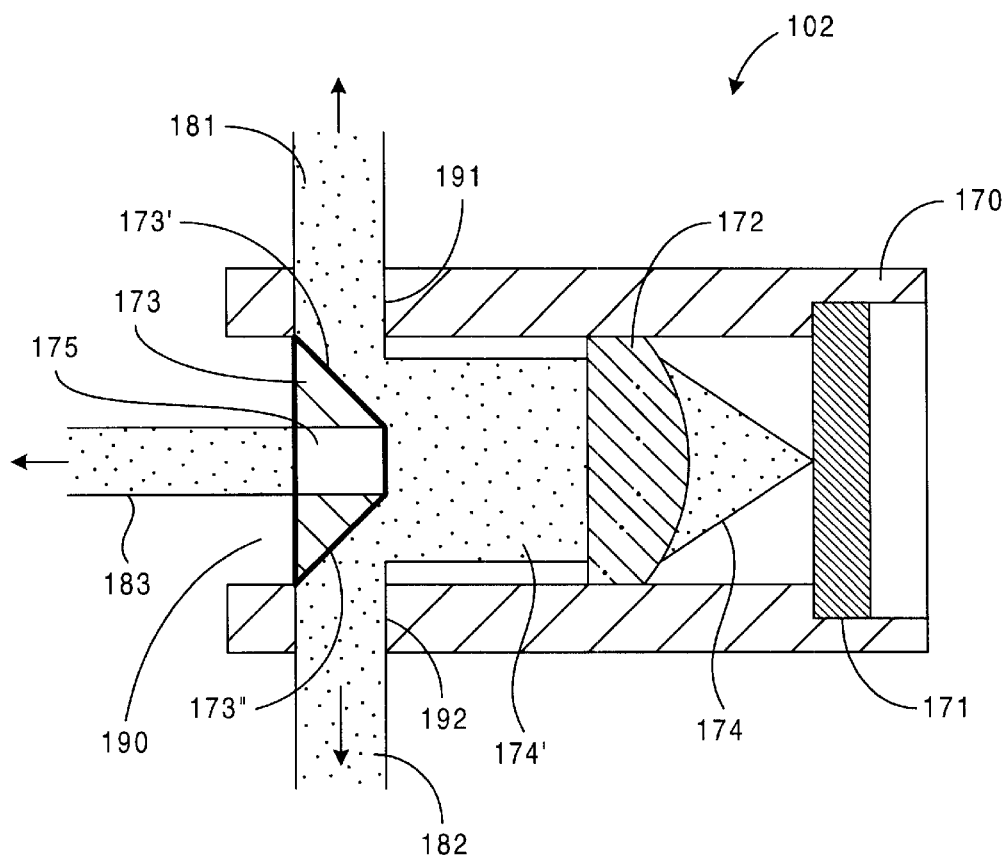
FIGS. 11A and 11B depict a cross-section view and a perspective view of an embodiment of an optical assembly in accordance with the principles of the present invention.

One embodiment of an optical assembly 102 suitable for use in the embodiments depicted herein is illustrated by FIG. 11 A. The optical assembly 102 is presented in side section view. The optical assembly 102 includes a mounting bracket 170 (also referred to as an optics cylinder). Inside the optics cylinder 170 is fitted a semiconductor laser 171, a collimator 172, and a beam splitter 173. The optics cylinder 170 includes a plurality of apertures (only apertures 190, 191, and 192 are shown in this view) so that output beams can be directed out of the cylinder. The semiconductor laser 171 produces a laser beam 174 that is directed through a collimator 172 (here, a collimator lens) to produce a collimated beam 174'. The collimated beam is directed onto a beam splitter 173 where it is split into a plurality of output beams (three of which are shown here as output beams 181, 182, 183). In the preferred embodiment, the beam splitter 173 comprises four rectangular reflective surfaces (two of which are shown as 173', 173"). The rectangular surfaces are positioned obliquely in the path of the collimated beam 174' so as to reflect the collimated beam 174' to produce four output beams (only two of which are depicted here 181, 182) which lie at substantially right angles to each other. The four reflective surfaces are oriented substantially at 45° to the collimated beam. A first pair of the four reflective surfaces 173', 173" is positioned so as to produce a first pair of oppositely directed output beams 181, 182 on essentially the same line (co-linear). A second pair of the four reflective surfaces (not shown here) is positioned so as to produce a second pair of oppositely directed and essentially co-linear output beams. Also, the first pair of output beams 181, 182 intersects the second pair of beams (which extend in a direction normal to the plane of the page) at a substantially 900 angle. Also, the beam splitter 173 includes an aperture 175 permitting a central portion of the collimated beam 174' to pass through the beam splitter 173 as a fifth beam 183 on a line which intersects the first and second pairs of oppositely directed output beams and lies substantially at 90° to the first and second pairs of oppositely directed output beams.

Figure 11B:
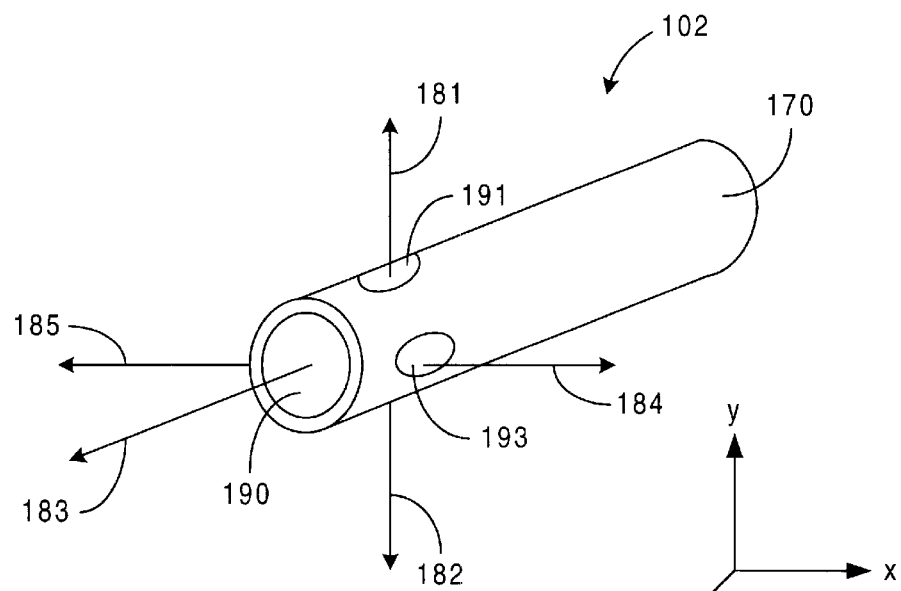

A perspective view of the optical assembly 102 is depicted in FIG. 11B. Shown is the optics cylinder 170 and substantially orthogonal output beams 181, 182, 183, 184, and 185. The output beam 183 is parallel to the z-axis, the first pair of oppositely directed output beams 181, 182 are parallel to the y-axis, and the second pair of oppositely directed output beams 184, 185 are parallel to the x-axis. Also, shown are apertures 190, 191, 193.

FIG. 12 depicts a simplified cross-section view of a two-axis bubble level 132. When the bubble 135 is centered in the level 132, the output beams are level. As the bubble level 132 is tilted, the bubble 135 moves from a centered position. This alters the position and amount of light 138 being detected by the position sensitive photo sensor 131. In order to more quickly center the bubble 135, the bubble level 132 can include a curved bubble face 136. In the preferred embodiment, the curved bubble face 136 has a radius of curvature. In the preferred embodiment, the curved bubble face 136 has a radius of curvature. The position sensitive photo sensor 131 can incorporate any of a number of commercially available position sensitive detectors sensitive to the detector light 134. Examples include, but are not limited to, quadrature detectors, charged coupled device (CCD) detectors, complementary metal oxide semiconductor (CMOS) image sensors (such as that taught in U.S. Pat. No. 5,461,425 to Fowler, et al. hereby incorporated by reference).

Figure 13:
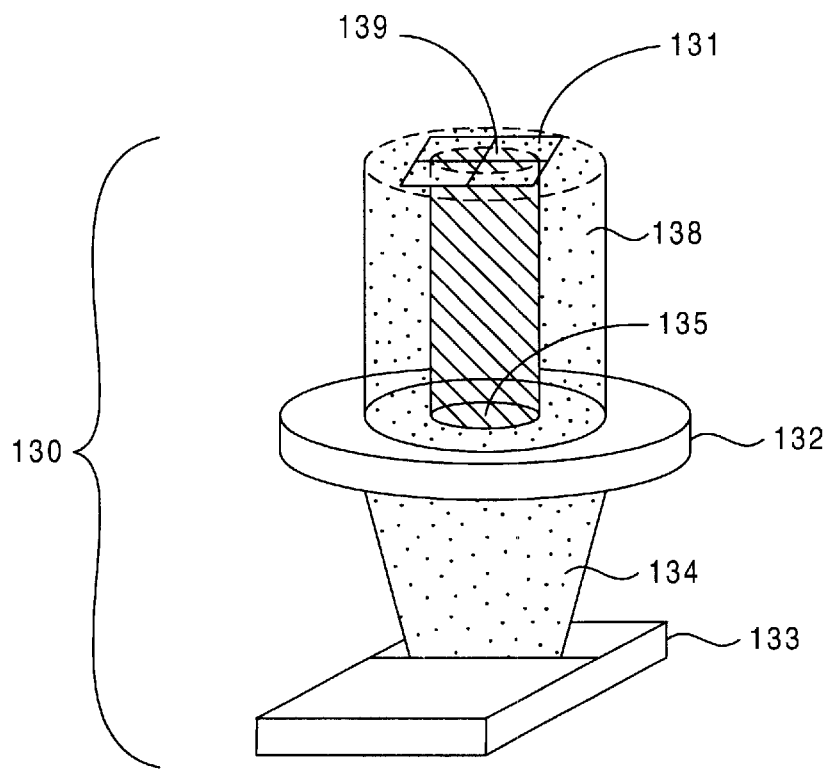
FIG. 13 is a perspective view of a simplified two-axis detector element in accordance with the principles of the present invention.

FIG. 13 is a simplified perspective view of an embodiment of a two-axis detector element 130 that can be mounted on an optical platform in accordance with the principles of the present invention. The light source 133 generates a detector light beam 134 that is directed through the two-axis bubble level 132 onto the quadrature detector 131. Detector light 134 passes readily through the fluid 137 but is refracted in large part by the bubble 135 of the two-axis bubble level 132. Consequently, the detector light 134 forms a ring of light 138 surrounding a dark spot 139. The ring 138 and spot 139 track the movement of the bubble 135 as the detector element 130 (and by consequence the output beams) is tilted. When the dark spot 139 is centered in the middle of the quadrature detector 131, the output beams are level. Therefore, when the dark spot 139 is not centered on the quadrature detector 131, adjustments are made to the angle of tilt of the optical platform until the dark spot 139 is centered. This is accomplished by selective activation of the driving element 120 until the dark spot 139 is centered. This is accomplished via the control circuitry of the system which adjusts the tilt angle of the optical platform in response to information received from the quadrature detector 131. Bubble detector embodiments can be constructed such that the inside walls of the bubble container are not easily wetted by the fluids contained therein. In one example, the fluid can be water and the inside surface of the bubble container can be treated with hydrophobic material.

Figure 14:
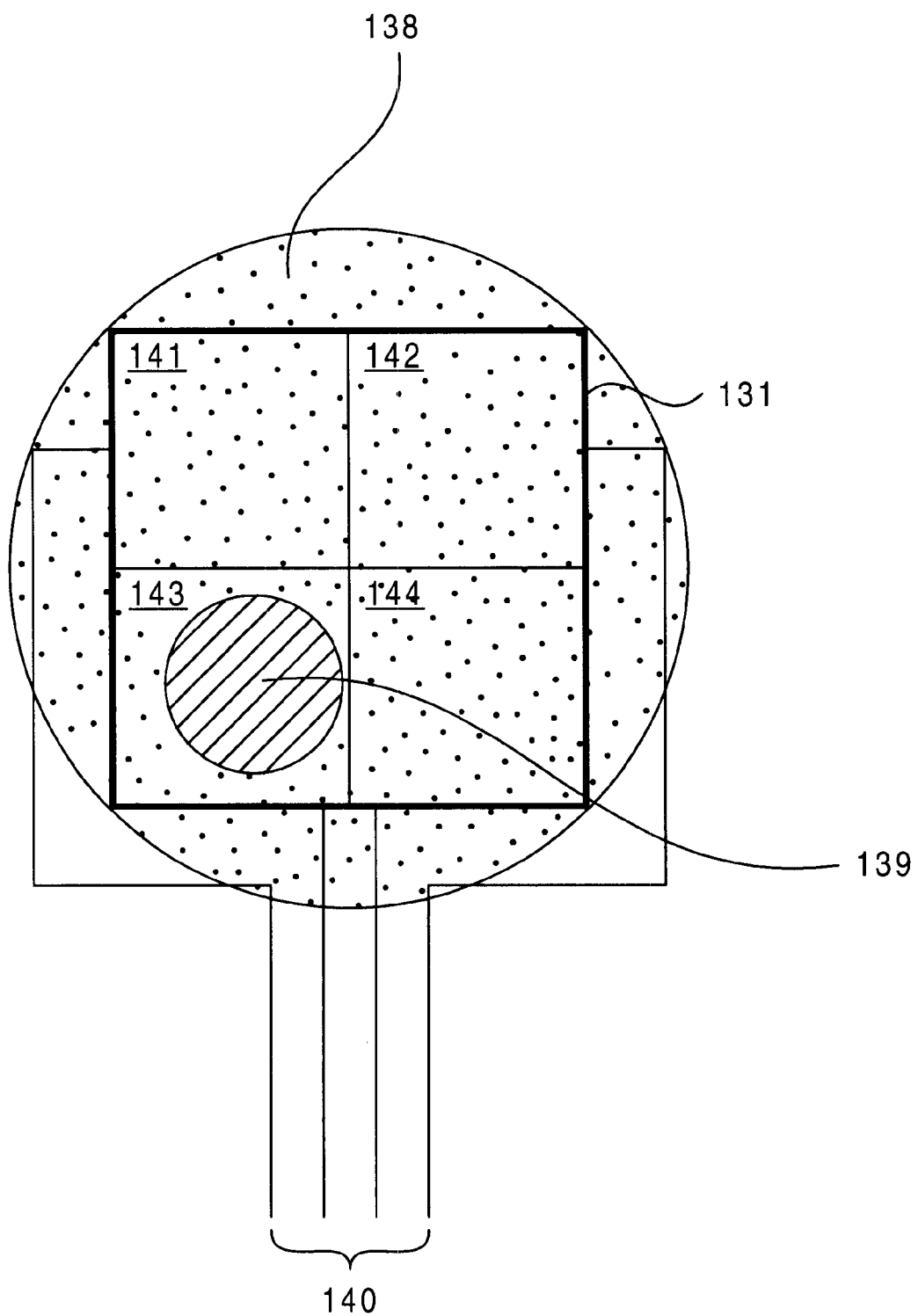
FIG. 14 depicts an embodiment of a quadrature detector in accordance with the principles of the present invention.

FIG. 14 depicts an embodiment of a quadrature detector 131 featuring the dark spot 139 and the light ring 138. Such an embodiment is suitable for use in accordance with the principles of the present invention. As can be seen, the quadrature detector 131 is fully illuminated except for the dark spot 139. As the sensor is tilted, the dark spot 139 moves with respect to the quadrature detector 131. By tracking the motion of the dark spot 139 the quadrature detector 131 provides leveling information. The detector element is calibrated so that the output beams are leveled when the dark spot 139 is centered in the quadrature detector 131. The quadrature detector 131 comprises four photodetectors 141, 142, 143, and 144. When the light ring 138 impinges on the photodetectors of the quadrature detector, electrical current is produced. The magnitude of the current bears a relationship to the intensity of the light impinging on the photodetectors 141, 142, 143, and 144. This light intensity is reduced by the presence of the dark spot 139. The current produced by the photodetectors is measured and processed to determine the location of the dark spot 139 on the quadrature detector 131. Typically, the current produced by the photodetectors is conducted away from the detector using conductive lines 140, which can be connected to the control circuitry of the device. The current from the photodetectors 141, 142, 143, and 144 is processed to determine the position of the dark spot 139. One example of a method used to determine the spot 139 position is as follows: In order to determine the left/right (L/R) position of the spot 139, the current $I_{141}$ produced from photodetector 141 is summed with the current $I_{143}$ produced by photodetector 143, and the current 1142 produced by photodetector 142 is summed with the current $I_{144}$ produced photodetector 144. The two sums are subtracted from each other as shown in the equation below.

$$(I_{141}+I_{143})-(I_{142}+I_{144})=\text{L/R Position Current}$$

If the L/R position current is negative, it is known that the spot 139 is too far to the left. And, conversely, if the L/R position current provides a positive value, it is known that the spot 139 is too far to the right.

The up and down positions of the spot can also be determined with the quadrature detector 131. For example, in accordance with the following equation:

$$(I_{141}+I_{142})-(I_{143}+I_{144})=\text{Up/Down Position Current}$$

If the up/down position current is positive, the spot is too low. Conversely, if the up/down position current is negative, then the spot is too high. If the depicted spot 139 is used as an example, the left/right position current will be negative and the up/down position current will be positive, which will allow the control circuitry to detect the fact that the beam is in the quadrant detected by photodetector 143. Based on this information, the driving elements are activated to adjust the tilt angle of the optical platform in order to move the dark spot 139 higher and to the right leveling the bubble, thereby leveling the output beams. This is one mode of operation for a detector element used to level light beams.

In another embodiment, the light ring 138 (and dark spot 139) can be generated by a plurality of LED's. Once the device is leveled, the brightness of each of these LED's can be adjusted until the dark spot 139 is centered on the light detector 131. This is advantageous because it can be accomplished electronically without the need for costly and time consuming alignment steps. Instead, simple adjustment of LED brightness can be used to center the dark spot 139 in a calibration step. One such embodiment can use four LED's.

Figure 15:
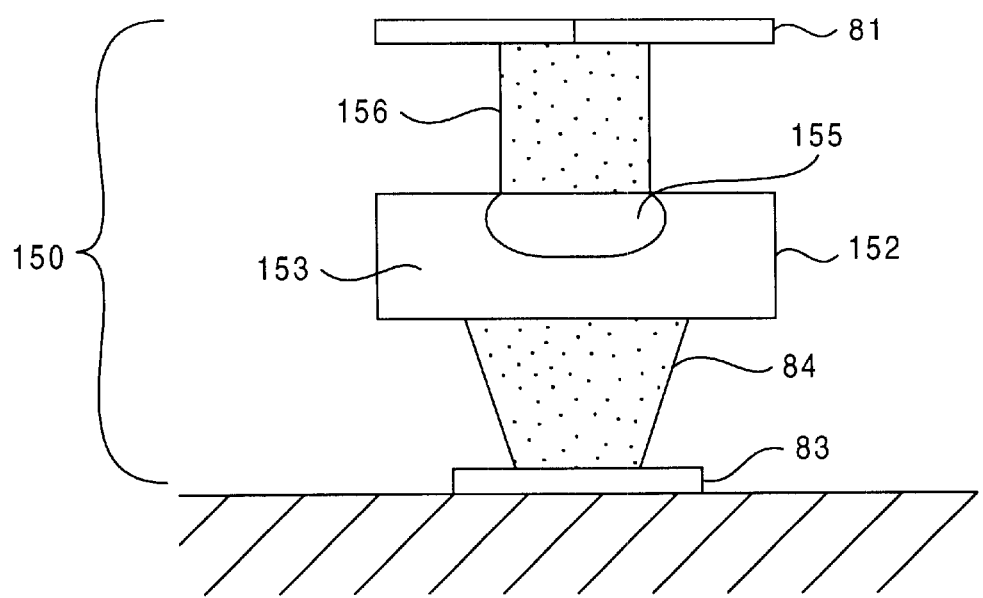
FIGS. 15 and 16 are side-section views of additional sensor element embodiments in accordance with the principles of the present invention

FIG. 15 depicts the operation of yet another sensor embodiment 150. The sensor element is depicted in a cross-section view. The sensor element 150 includes a position sensitive photo sensor 81, a bubble level device 152, and a detector light source 83 for generating a detector light beam 84 (also referred to as detector light). As with the previously discussed embodiments, many different types of detector light sources 83 can be used, with LED's being preferred. Detector light 84 is passed through the bubble level device 152 onto a position sensitive photo sensor 81, which detects whether the bubble level device 152 is leveled (as is the case in FIG. 15). In the depicted embodiment, bubble fluid 153 is treated so that it is relatively opaque to the detector light 84. For example, a dye can be added to the bubble fluid 153 so that a portion of the detector light passes through the bubble level device 152 in the region of the bubble 155, but not through the fluid 153. In other words, the detector beam 84 passes readily through the bubble 155 of the bubble level 152, but is absorbed by the fluid 153. As a result, a detector light beam 156 exits the bubble level 152.

Unlike the forgoing embodiments, where the detector beam is ring-shaped, this detector light beam 156 is characterized by a light spot defined by the bubble 155. As with the previous embodiments, the sensor 80 can be oriented so that the beam 84 points downward.

Figure 16:
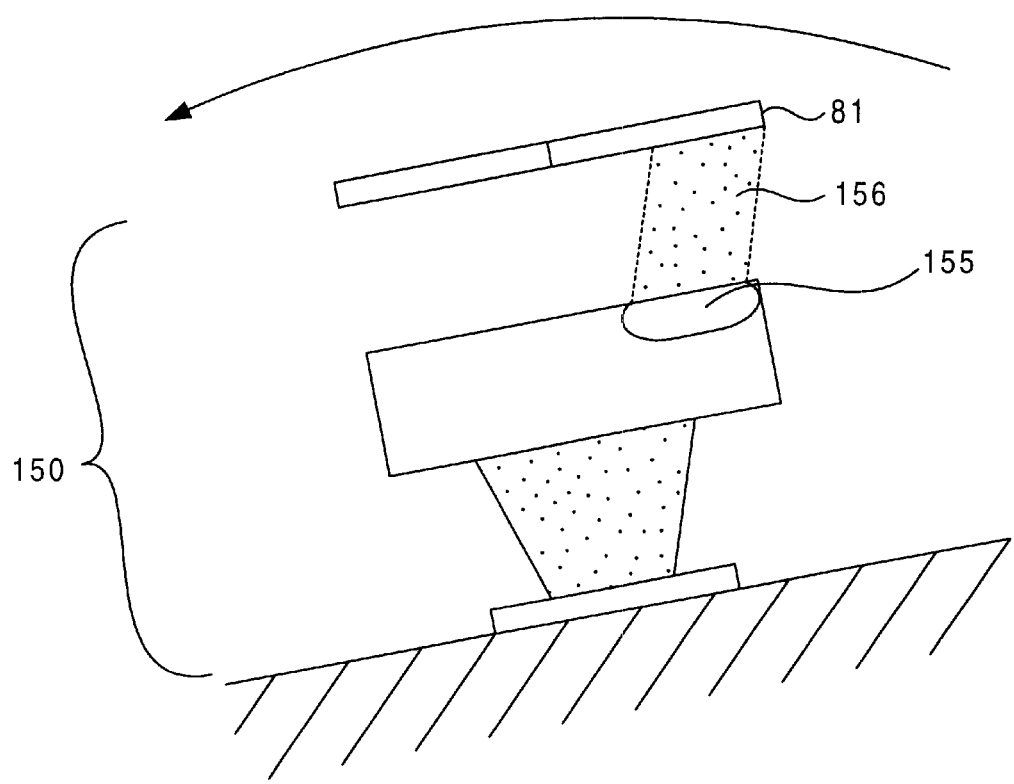

FIG. 16 shows a detector 150 tilted to the left. Consequently, the bubble 155 moves to the right, altering the amount and position of light 156 sensed by the position sensitive photo sensor 81. In accordance with the principles of the present invention, the position sensitive photo sensor 81 provides information to control circuitry (not shown here) which activates driving element 63 (of FIGS. 7A–7D) to correct the tilt in the output beam 64.

The position sensitive photo detectors work similarly to those described hereinabove. The chief difference being that the electrical information is processed by the photo detectors in a slightly different manner to track the light spot as it moves across the photo detectors. Such methods are known to those having ordinary skill in the art.

Another suitable detector element embodiment can use a pair of single-axis bubble levels arranged at right angles to each other so that a level with respect to a first and second axis can be detected. Each single-axis bubble level is associated with a corresponding light source and a corresponding position sensitive detector. Each corresponding light source and corresponding position sensitive detector is arranged to detect whether each single-axis bubble level is leveled. By leveling each single-axis bubble level, the output beams can be leveled with respect to the aforementioned first and second axes.

Figure 17:
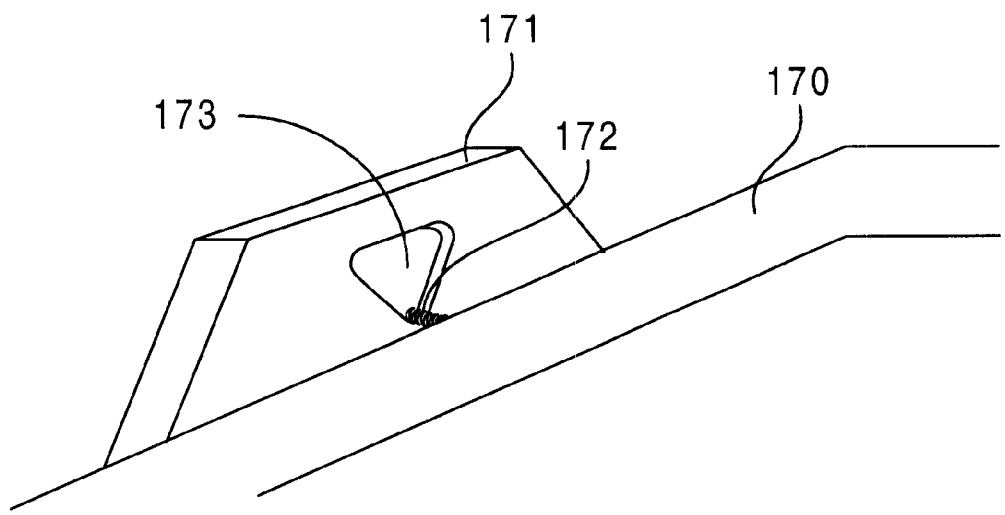
FIG. 17 is a perspective view of an embodiment of a pin and V-block "slip-stick" mechanism formed at the joint between two tiltably engaged components.

As discussed hereinabove, an important component of embodiments constructed in accordance with the principles of the present invention is the "slip-stick" joint. One embodiment of such a "slip-stick" joint is shown in FIG. 17. The "slip-stick" mechanism is formed at the joint between two tiltably engaged components. For example, one tiltably engaged component can be a frame 170 and the other tiltably engaged component can be a frame support 171. The frame 170 can include a pin 172. The joint is formed where the pin 172 is engaged with the support 171. The pin 172 fits into a V-block mounting notch 173 of the support 171. The notch 173 is sized with respect to the pin 172 so that the frame 170 can rotate in response to applied torque, but also prevents substantial movement or oscillation of the frame in the absence of the applied torque. Consequently, the frame 170 can hold its new position until further applied torques are induced. Also, the angle of the sides of the V-block mounting notch 173 is chosen such that the pin 172 does not climb up the side of the mounting notch 173 in response to the applied torque. In addition, materials can be chosen to increase or decrease the friction between the pin 172 and the frame 170, thereby adjusting the "slip-stick" mechanism. In one suitable example, the notch 173 has an acrylonitrile butadine styrene (ABS) surface and the pin 172 is made of aluminum. The foregoing material combination is illustrative, and in no way interpreted as limiting the invention. Many material combinations known to one having ordinary skill in the art may be used.

Figure 18:
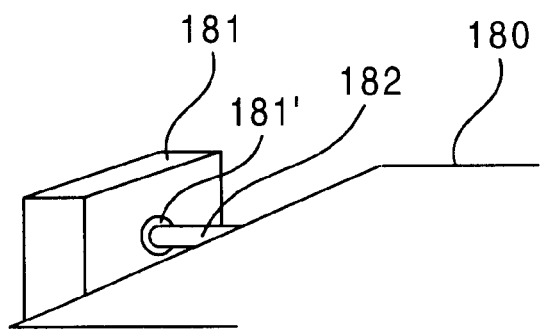
FIG. 18 is a perspective view of another embodiment of a "slip-stick" mechanism formed at the joint between two tiltably engaged components.

Another "slip-stick" mechanism that can be formed at the joint between two tiltably engaged components is shown in FIG. 18. A support 181 includes an annular fitting 181' into which a pin 182 of the component 180 is fitted to form a tiltable joint. A suitable joint includes an ABS fitting 181' and a metal pin 182. The frictional engagement of the pin 182 with the fitting 181' constitutes the "slip-stick" mechanism.

Figure 19:
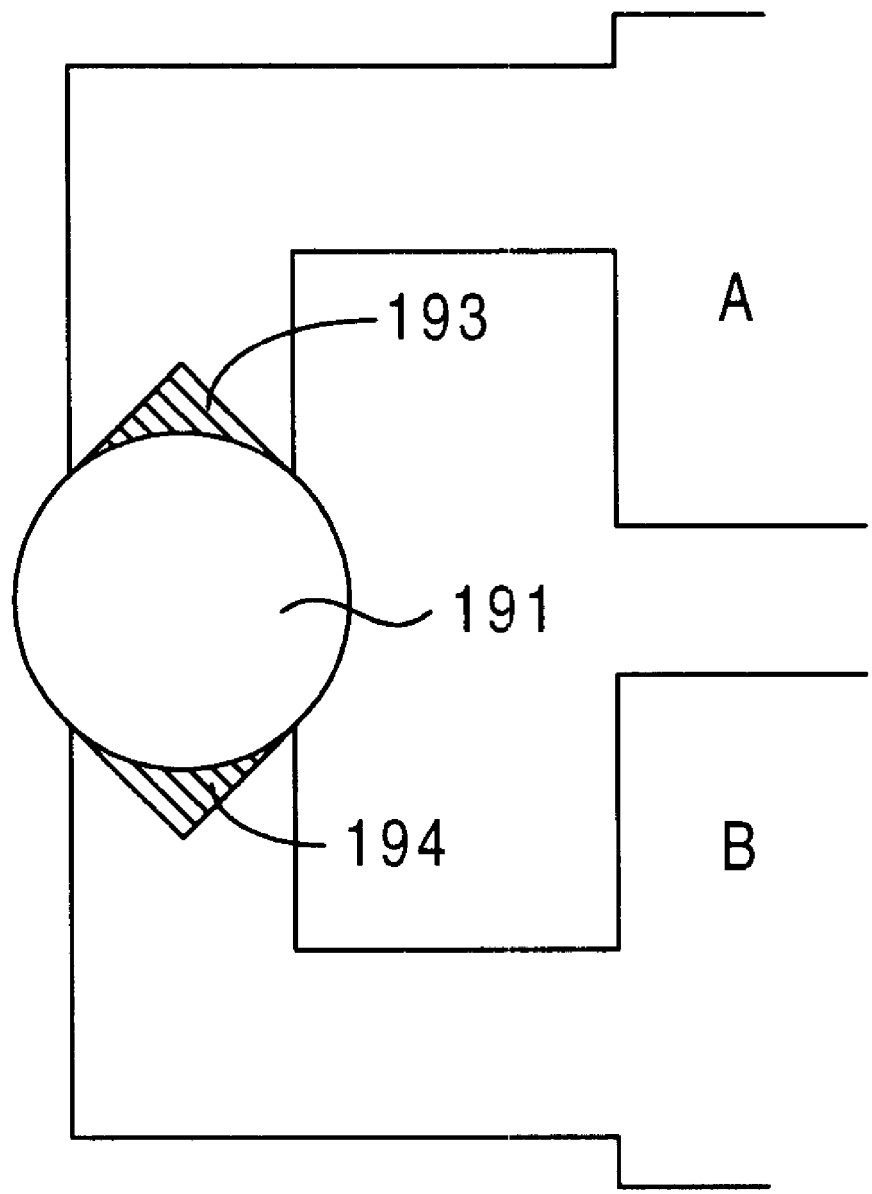
FIG. 19 is a section view of an embodiment of a ball and cone "slip-stick" mechanism formed at the joint between two tiltably engaged components.

FIG. 19 depicts a section view of yet another "slip-stick" mechanism that can be formed at the joint between two tiltably engaged components. Generally, the depicted embodiment includes a pair of components, each including an engagement feature. Positioned between the two engagement features is a ball. The components slide over the ball in response to applied torque. FIG. 19 shows a first component A and a second component B positioned about a ball. First component A includes cone-shaped engagement cone 193. A second component B includes a matching engagement cone 194. The engagement cones 193, 194 are positioned to trap therebetween a ball-bearing 191. If first component A corresponds to an optical platform and second component B corresponds to a base component, the engagement cone 193 can move over the ball 191 in response to an applied torque. Other features can be added to prevent the ball 191 from becoming disengaged from the engagement cones 193, 194. The engagement cones 193, 194 are fitted to the ball 191 such that the engagement cones 193, 194 frictionally engage the ball 191 in a "slip-stick" arrangement so that the components A, B can rotate in response to applied torque, but also prevent substantial movement or oscillation of the components in the absence of the applied torque. Consequently, the components can hold their new position until further applied torques are induced. Components A and B can be selected from among any of the leveling components including, but not limited to, optical assembly, optical platform, frame, support, cradle, housing, or other suitable components.

Figure 20:
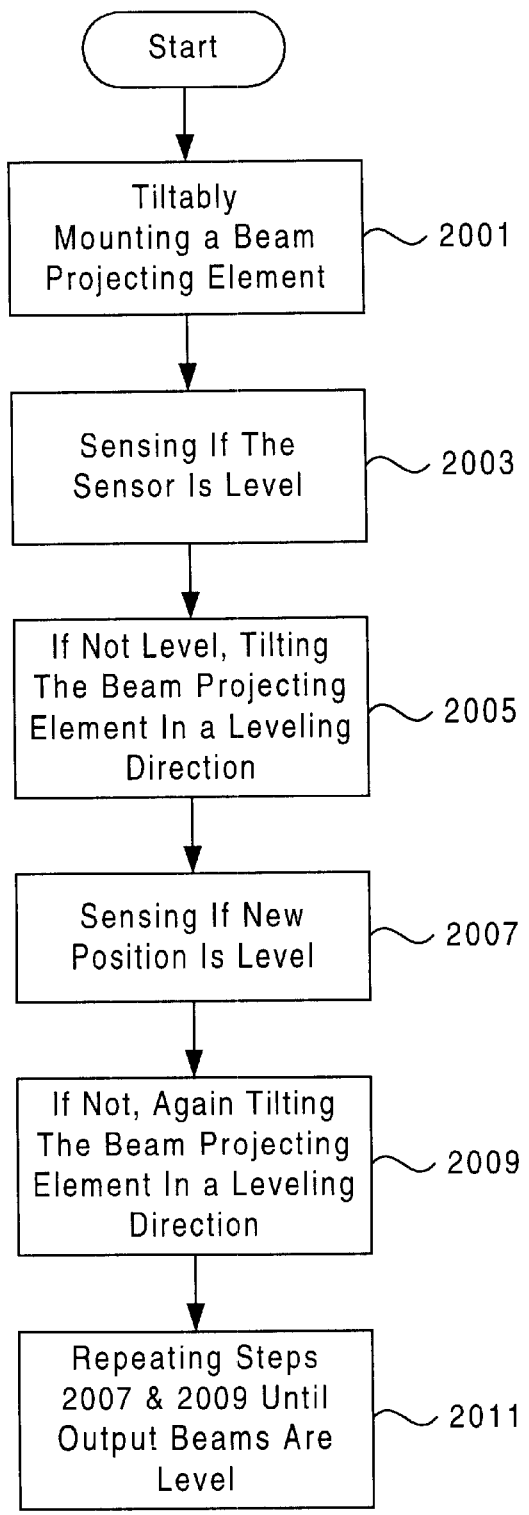
FIG. 20 is a flow diagram illustrating a method embodiment suitable for leveling output beams in accordance with the principles of the present invention.

FIG. 20 is a flow diagram illustrating a method embodiment suitable for leveling output beams in accordance with the principles of the present invention. A first step (Operation 2001) includes mounting an optical assembly such that the optical assembly can tilt about two axes and hold its position after being controllably tilted, the optical assembly capable of generating light beams. In one example, the optical assembly can be mounted on an optical platform capable of tilting in two orthogonal axes. A next step includes sensing if the optical assembly is leveled (Operation 2003). In one embodiment, this can be accomplished by using the bubble detector elements described hereinabove. If the light beams generated by the optical assembly are not level, the optical assembly (i.e., the optical platform) is controllably tilted in a leveling direction to a new angle (Operation 2005). This can be accomplished, for example, by activating the actuator elements (discussed hereinabove) to move the optical platform in a direction closer to level. Again, sensing if the optical assembly is level when the optical assembly is at the new angle (Operation 2007). This is much the same process as in Operation 2003. If the light beams generated by the optical assembly are not level at the new angle, the optical assembly (i.e., the optical platform) is controllably tilted in a leveling direction to a another angle (Operation 2009). This is much the same process as in Operation 2005. The leveling process includes continuously sensing and tilting as in Operations 2007 and 2009 until the light beams are leveled.

The present invention has been particularly shown and described with respect to certain preferred embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. Other embodiments and variations to the depicted embodiments will be apparent to those skilled in the art and may be made without departing from the spirit and scope of the invention as defined in the following claims. In particular, it is contemplated by the inventors that the principles of the present invention can be practiced with a number of different "slip-stick" mechanisms, a variety of different drive element actuators, or sensor elements. Further, reference in the claims to an element in the singular is not intended to mean "one and only one" unless explicitly stated, but rather, "one or more". Furthermore, the embodiments illustratively disclosed herein can be practiced without any element which is not specifically disclosed herein.

We claim:

1. An optical level comprising:

an optical assembly for generating a light beam;

a platform that supports the optical assembly;

a slip-stick mechanism that pivotably supports the platform for rotation in at least one degree of freedom, the slip-stick mechanism providing sufficient stiction to hold the platform in place even when the platform is tilted somewhat relative to level, while permitting the platform to pivot with relatively lower friction when the stiction is overcome; and at least one actuator arranged to cause motion of the platform by supplying sufficient force to the platform to overcome stiction from the slip-stick mechanism.

2. An optical level as recited in claim 1 further comprising:

a sensor for providing signals that may be used to determine whether the platform is level; and control circuitry for controllably activating at least one actuator to tilt the platform element towards level in a manner so that at least one visible light beam is substantially level.

3. The optical level of claim 2 wherein the sensor comprises:

a light source for producing a detector light beam;

a two-axis bubble level aligned with the light beam such that when the two-axis bubble level is leveled, the light beam is also level;

a position sensitive light detector that is sensitive to the detector light beam; and the light source positioned so that it projects the detector light beam through the two-axis bubble level onto the position sensitive light detector so that the detector can determine whether the two-axis bubble level is leveled.

4. The optical level of claim 3 wherein the sensor is oriented such that the detector light beam is directed in a downward direction passing through the two-axis bubble level onto the position sensitive light detector that is positioned underneath the two-axis bubble level.

5. The optical level of claim 3 wherein the sensor is oriented such that the detector light beam is directed in an upward direction passing through the two-axis bubble level onto the position sensitive light detector that is positioned above the two-axis bubble level.

6. The optical level of claim 3 wherein the position sensitive light detector is selected from among a quadrature detector, a charged coupled device detector, and a complementary metal oxide semiconductor detector.

7. The optical level of claim 2 wherein the sensor comprises:

a first single-axis bubble level aligned with the light beam such that when the first single-axis bubble level is leveled with respect to a first axis, then the light beam is at some first predetermined angle with respect to the first axis;

a second single-axis bubble level aligned with the light beam such that when the second single-axis bubble level is leveled with respect to a second axis, then the light beam is at some second predetermined angle with respect to the second axis;

a first light source and a second light source;

a first position sensitive light detector and a second position sensitive light detector;

the first light source positioned so that it projects a first detector beam through the first single-axis bubble level onto the first position sensitive light detector so that the first position sensitive light detector can determine whether the first single-axis bubble level is level with respect to the first axis; and the second light source positioned so that it projects a second detector beam through the second single-axis bubble level onto the second position sensitive light detector so that the second position sensitive light detector can determine whether the second single-axis bubble level is level with respect to the second axis.

8. The optical level of claim 2 wherein the sensor comprises:

a first single-axis bubble level aligned with the light beam such that when the first single-axis bubble level is oriented at a first predetermined angle with respect to a first axis, then the light beam is level with respect to the first axis;

a second single-axis bubble level aligned with the light beam such that when the second single-axis bubble level is oriented at a second predetermined angle with respect to a second axis, then the light beam is level with respect to the second axis;

a first light source and a second light source;

a first position sensitive light detector and a second position sensitive light detector;

the first light source positioned so that it projects a first detector beam through the first single-axis bubble level onto the first position sensitive light detector so that the first position sensitive light detector can determine whether the first single-axis bubble level is oriented at the first predetermined angle with respect to a first axis; and the second light source positioned so that it projects a second detector beam through the second single-axis bubble level onto the second position sensitive light detector so that the second position sensitive light detector can determine whether the second single-axis bubble level is oriented at the second predetermined angle with respect to a second axis.

9. The optical level of claim 2 wherein the sensor comprises:

a first single-axis bubble level aligned with the light beam such that when the first single-axis bubble level is leveled with respect to a first axis, that the light beam is also level with respect to the first axis;

a second single-axis bubble level aligned with the light beam such that when the second single-axis bubble level is leveled with respect to a second axis, that the light beam is also level with respect to the second axis;

a first light source and a second light source;

a first position sensitive light detector and a second position sensitive light detector;

the first light source positioned so that it projects a first detector beam through the first single-axis bubble level onto the first position sensitive light detector so that the first position sensitive light detector can determine whether the platform is level with respect to the first axis; and the second light source positioned so that it projects a second detector beam through the second single-axis bubble level onto the second position sensitive light detector so that the second position sensitive light detector can determine whether the platform is level with respect to the second axis.

10. The optical level of claim 9 wherein the first single-axis bubble level and the second single-axis bubble level are oriented at substantially 90° to each other.

11. An optical level comprising:

an optical assembly for generating an output light beam;

a platform that supports the optical assembly;

a slip-stick mechanism that pivotably supports the platform for rotation in at least one degree of freedom, the slip-stick mechanism providing sufficient stiction to hold the platform in place even when the platform is tilted somewhat relative to level, while permitting the platform to pivot with relatively lower friction when the stiction is overcome;

a sensor for providing signals that may be used to determine whether the platform is level, the sensor comprising:

a light source for producing a detector light beam;

a two-axis bubble level aligned with the output light beam such when the two-axis bubble level is leveled that the output light beam is also level;

a position sensitive light detector that is sensitive to the detector light beam;

wherein the light source positioned so that it projects the detector light beam through the two-axis bubble level onto the position sensitive light detector so that the detector can determine whether the two-axis bubble level is leveled; and an actuator arranged to cause motion of the platform by supplying sufficient force to the platform to overcome stiction from the slip-stick mechanism.

12. An optical level as recited in claim 11 further comprising:

control circuitry for controllably activating the actuator to tilt the platform element towards level in a manner so that the output light beam is substantially level.

13. An optical level as recited in claim 12 wherein the signals provided by the sensor are used by the control circuitry to controllably activate the actuator to tilt the platform element so that the output light beam is substantially level.

14. A leveling assembly comprising:

a pivotably mounted platform capable of rotation in at least one degree of freedom;

an actuator arranged to cause motion of the platform by supplying sufficient force to tilt the platform;

a sensor for providing signals that may be used to determine whether the platform is level, the sensor comprising:

a light source for producing a detector light beam;

a two-axis bubble level aligned with the platform such when the two-axis bubble level is leveled that the platform is also level;

a position sensitive light detector that is sensitive to the detector light beam; and the light source positioned so that it projects the detector light beam through the two-axis bubble level onto the position sensitive light detector so that the detector can determine whether the platform is leveled.

15. A leveling assembly as in claim 14 further comprising a slip-stick mechanism that pivotably supports the platform for rotation in at least one degree of freedom, the slip-stick mechanism providing sufficient stiction to hold the platform in place even when the platform is tilted somewhat relative to level, while permitting the platform to pivot with relatively lower friction when the stiction is overcome; and wherein the actuator is arranged to cause motion of the platform by supplying sufficient force to the platform to overcome stiction from the slip-stick mechanism.

16. The leveling assembly as in claim 15, wherein the sensor is oriented such that the detector light beam is directed in a downward direction passing through the two-axis bubble level onto the position sensitive light detector that is positioned underneath the two-axis bubble level.

17. The leveling assembly as in claim 15, wherein the sensor is oriented such that the detector light beam is directed in an upward direction passing through the two-axis bubble level onto the position sensitive light detector that is positioned above the two-axis bubble level.

18. A leveling assembly as in claim 15 further comprising an optical assembly for generating a light beam, said assembly being mounted on the optical platform so that said leveling of the two-axis bubble results in leveling of the light beam.

19. An apparatus for projecting a visible light beam in level or plumb direction, in spite of a tilted condition of the apparatus, the apparatus comprising:

an optical assembly tiltably mounted such that the optical assembly can tilt about two axes and hold its position, the optical assembly capable of generating at least one visible light beam;

a driving element, which when appropriately activated can tilt the optical assembly about either of the two axes;

a sensor element for determining if the at least one visible light beam generated by the optical assembly is level; and control circuitry for controllably activating the driving element to tilt the optical assembly in a manner so that the at least one visible light beam is substantially level.

20. The apparatus of claim 19 wherein the tiltably mounted optical assembly includes a slip-stick mechanism that enables the optical assembly to move in response to torque applied by the driving element and prevents substantial movement or oscillation of the optical assembly in the absence of actuator induced torque.

21. The apparatus of claim 20 wherein the two axes, about which the optical assembly tilts, are substantially perpendicular to each other.

22. The apparatus of claim 20 wherein the slip-stick mechanism comprises a plurality of frictionally engaged joints enabling rotation in two axes in response to torque applied by the actuator element but prevents substantial movement or oscillation of the optical assembly in the absence of said driving element induced torque.

23. The apparatus of claim 22 wherein the frictionally engaged joints forming the slip-stick mechanism comprise a plurality of pins frictionally engaged with a corresponding plurality of V-blocks thereby enabling rotation in two axes in response to torque applied by the actuator element and preventing substantial movement or oscillation of the optical assembly in the absence of said driving element induced torque.

24. An apparatus as in claim 20 wherein the slip-stick mechanism comprises:

a first component having a first engagement feature;

a second component having a second engagement feature; and a ball shaped component;

wherein the ball shaped component is positioned between and engaged with the first engagement feature and the second engagement feature, defining a slip-stick mechanism that enables the first component and the second component to rotate about the ball-shaped engagement feature in response to an applied torque.

25. The apparatus as in claim 24 wherein the first engagement feature and the second engagement feature are conically shaped engagement cones.

26. The apparatus of claim 20 wherein the apparatus includes a housing, and wherein the optical assembly is tiltably mounted in the housing using an arrangement comprising:

a movable frame element having an inside periphery and an outside periphery;

the outside periphery of the movable frame element engaged to the housing using a first joint that defines a first axis of rotation about which the movable frame element can rotate; and the optical assembly suspended in the movable frame element using a second joint that defines a second axis of rotation about which the optical assembly can rotate.

27. The apparatus of claim 26 wherein the first joint engaging the movable frame element to the housing comprises a first set of pins positioned at the outside periphery of the movable frame element engaged to a corresponding first set of V-blocks in the housing, the first set of pins defining the first axis of rotation; and wherein the second joint comprises a second set of pins positioned at the outside periphery of the movable frame element engaged to a corresponding second set of V-blocks positioned at the inside periphery of the movable frame element, the second set of pins defining the second axis of rotation.

28. The apparatus of claim 20 wherein the driving element comprises: at least one actuator element positioned such that activation of the driving element can controllably induce deflection of the optical assembly about the two axes of rotation.

29. The apparatus of claim 28 wherein the at least one actuator element is selected from the group of fan actuators, electro-magnetic actuators, electro-static actuators, and electric motors.

30. The apparatus of claim 28 wherein the at least one actuator element includes a first electric motor and a second electric motor, each electric motor positioned so that when the first motor is activated it produces a torque which induces a tilt about the first axis and when the second motor is activated it induces a tilt about the second axis.

31. The apparatus of claim 20 wherein the optical assembly capable of generating at least one visible light beam produces at least three mutually orthogonal visible light beams.

32. The apparatus of claim 20 wherein the optical assembly capable of generating at least one visible light beam comprises:

a mounting bracket having mounted thereon a laser diode for producing a visible laser beam which is directed through a collimator to produce a collimated beam that is directed onto a beam splitter to form a plurality of substantially orthogonal intersecting output beams.

33. The apparatus of claim 32 wherein the beam splitter splits the collimated beam into five output beams, a first pair of output beams that are substantially co-linear with respect to each other, and a second pair of output beams that are substantially co-linear with respect to each other, the first and second pairs of output beams intersecting each other at substantially right angles to each other, and a fifth beam on a line which intersects the first and second pairs of oppositely directed output beams and lies substantially at 90° to the first and second pairs of oppositely directed output beams.

34. The apparatus of claim 32 wherein the beam splitter comprises four reflective surfaces positioned obliquely in the path of the collimated beam so as to reflect the collimated beam to produce four output beams which lie at substantially right angles to each other, the four reflective surfaces oriented substantially at 45° to the collimated beam, a first pair of the four reflective surfaces positioned so as to produce a first pair of oppositely directed output beams on essentially the same line, a second pair of the four reflective surfaces positioned so as to produce a second pair of oppositely directed output beams on essentially the same line, wherein said first pair of oppositely directed output beams lies substantially at 90° from said second pair of beams, and wherein the beam splitter includes an aperture permitting a central portion of the collimated beam to pass through the beam splitter as a fifth beam on a line which intersects the first and second pairs of oppositely directed output beams and lies substantially at 90° to the first and second pairs of oppositely directed output beams.

35. The apparatus of claim 34 wherein the reflective surfaces of the beam splitter comprise rectangular reflective surfaces.

36. The apparatus of claim 20 wherein the sensor element for determining if the at least one visible light beam generated by the optical assembly is level comprises an electro-optic sensor.

37. The apparatus of claim 36 wherein the electro-optic sensor element comprises:
a light source for producing a detector light beam;
a two-axis bubble level aligned with the at least one visible light beam such when the two-axis bubble level is leveled, that the at least one visible light beam is also level;
a position sensitive light detector that is sensitive to the detector light beam; and
the light source positioned so that it projects the detector light beam through the two-axis bubble level onto the position sensitive light detector so that the detector can determine whether the two-axis bubble level is leveled.

38. The apparatus of claim 37, wherein the sensor is oriented such that the detector light beam is directed in a downward direction passing through the two-axis bubble level onto the position sensitive light detector that is positioned underneath the two-axis bubble level.

39. The apparatus of claim 37, wherein the sensor is oriented such that the detector light beam is directed in an upward direction passing through the two-axis bubble level onto the position sensitive light detector that is positioned above the two-axis bubble level.

40. The apparatus of claim 37 wherein the position sensitive light detector is selected from among a quadrature detector, a charged coupled device detector, and a complementary metal oxide semiconductor detector.

41. The apparatus of claim 37 wherein the light source is selected from among a light emitting diode, a laser diode, and an incandescent light bulb.

42. The apparatus of claim 36 wherein the electro-optic sensor element comprises:
a first single-axis bubble level for measuring whether the at least one visible light beam is substantially level with respect to a first axis;
a second single-axis bubble level for measuring whether the at least one visible light beam is substantially level with respect to a second axis;
the first single-axis bubble level and the second single-axis bubble level oriented at substantially 90° to each other;
a first light source and a second light source;
a first position sensitive light detector and a second position sensitive light detector;
the first light source positioned so that it projects a first detector beam through the first single-axis bubble level onto the first position sensitive light detector so that the first position sensitive light detector can determine whether the at least one visible light beam is substantially level with respect to the first axis; and
the light source positioned so that it projects a second detector beam through the second single-axis bubble level onto the second position sensitive light detector so that the second position sensitive light detector can determine whether the at least one visible light beam is substantially level with respect to the second axis.

43. An apparatus for projecting a visible light beam in level or plumb direction, in spite of a tilted condition of the apparatus, the apparatus comprising:
a housing;
an optical platform tiltably mounted in the housing such that it can tilt in two axes about slip-stick joints;
an optical assembly mounted on the optical platform, the optical assembly capable of generating at least three orthogonal output light beams;
an actuator element which, when appropriately activated, tilts the optical platform about said two axes;
a sensor element for determining if the optical assembly is level; and
control circuitry in communication with the sensor element and the actuator element, the control circuitry for controllably activating the actuator element to tilt the optical platform so that the optical assembly is level.

44. An apparatus as in claim 43 wherein the slip-stick joints comprise a pin and V-block arrangement.

45. An apparatus as in claim 43 wherein the slip-stick joints comprise:
a first component having a pin, wherein the pin includes a ball-shaped engagement feature at a distal end; and
second component having a pair of engagement cones positioned to frictionally engage the ball-shaped engagement feature, thereby defining a tiltable slip-stick joint.

46. An apparatus as in claim 43 wherein the sensor element comprises:
a light source for producing a detector light beam;
a two-axis bubble level aligned so that when the two-axis bubble level is leveled, that the at least three orthogonal output light beams are also leveled;
a position sensitive light detector that is sensitive to the detector light beam; and
the light source positioned so that it projects the detector light beam through the two-axis bubble level onto the position sensitive light detector so that the detector can sense whether the two-axis bubble level is leveled.

47. The apparatus of claim 46, wherein the sensor element is oriented such that the detector light beam is directed in a downward direction passing through the two-axis bubble level onto the position sensitive light detector that is positioned underneath the two-axis bubble level.

48. The apparatus of claim 46, wherein the sensor element is oriented such that the detector light beam is directed in an upward direction passing through the two-axis bubble level onto the position sensitive light detector that is positioned above the two-axis bubble level.

49. A method for projecting a visible light beam in level or plumb direction, in spite of a tilted condition of an optical assembly comprising:

a. mounting an optical assembly such that the optical assembly can tilt about two axes and hold its position after being controllably tilted, the optical assembly capable of generating at least one visible light beam;

b. sensing if the at least one visible light beam generated by the optical assembly is level;

c. controllably tilting the optical assembly to a new angle in the event that the at least one visible light beam generated by the optical assembly is not level;

d. sensing if the at least one visible light beam generated by the optical assembly is level when the optical assembly is at the new angle;

e. controllably tilting the optical assembly to another angle if the new angle is such that the at least one visible light beam generated by the optical assembly is not level; and f. repeating the operations of sensing and tilting as in Steps (d) and (e) until the at least one visible light beam generated by the optical assembly is level.

50. The method of claim 49 wherein the operation of sensing if the at least one visible light beam generated by the optical assembly is level comprises:

providing a two-axis bubble level aligned so that when the two-axis bubble level is leveled, that the at least one visible light beam generated by the optical assembly is also level;

providing at least one detector light beam to be projected through the two-axis bubble;

projecting the at least one detector light beam through the two-axis bubble level onto a position sensitive light detector; and detecting, with said detector light beam and position sensitive light detector, whether the at least one visible light beam generated by the optical assembly is level.

\* \* \* \* \*